(12) United States Patent
Said

(10) Patent No.: US 11,677,987 B2
(45) Date of Patent: Jun. 13, 2023

(54) JOINT TERMINATION OF BIDIRECTIONAL DATA BLOCKS FOR PARALLEL CODING

(71) Applicant: QUALCOMM Incorporated, San Diego, CA (US)

(72) Inventor: Amir Said, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/224,812

(22) Filed: Apr. 7, 2021

(65) Prior Publication Data

US 2022/0124376 A1 Apr. 21, 2022

Related U.S. Application Data

(60) Provisional application No. 63/092,443, filed on Oct. 15, 2020.

(51) Int. Cl.
*H04N 19/91* (2014.01)
*H04N 19/44* (2014.01)
*H04N 19/436* (2014.01)
*G06V 10/82* (2022.01)

(52) U.S. Cl.
CPC ............ *H04N 19/91* (2014.11); *G06V 10/82* (2022.01); *H04N 19/436* (2014.11); *H04N 19/44* (2014.11)

(58) Field of Classification Search
None
See application file for complete search history.

(56) References Cited

U.S. PATENT DOCUMENTS

| 2014/0044163 | A1 | 2/2014 | Sasai et al. |
| 2016/0088313 | A1* | 3/2016 | Fenney ............... H04N 19/593 382/234 |
| 2017/0311003 | A1* | 10/2017 | Wu ..................... H04N 19/182 |
| 2020/0159923 | A1 | 5/2020 | Coroiu et al. |

FOREIGN PATENT DOCUMENTS

WO 2019115865 A1 6/2019

OTHER PUBLICATIONS

International Search Report and Written Opinion—PCT/US2021/051124—ISA/EPO—dated Jan. 5, 2022.
(Continued)

*Primary Examiner* — Tracy Y. Li
(74) *Attorney, Agent, or Firm* — Polsinelli LLP

(57) ABSTRACT

Techniques are described herein for processing video data. For instance, a process can include obtaining encoded video data. The process can include determining an intersection of values between values for a first termination byte of a first parcel of the encoded video data and values of a second termination byte of a second parcel of the encoded video data. The process can further include determining a joint termination byte for the first termination byte of the first parcel and the second termination byte of the second parcel. Values for the joint termination byte are based on the intersection of values. The process can include generating entropy coded data including the joint termination byte for the first parcel and the second parcel. The entropy coded data can be generated using arithmetic coding or binary coding.

30 Claims, 18 Drawing Sheets

(56) References Cited

OTHER PUBLICATIONS

Video Subgroup: "Working Draft 3 of Compression of Neural Networks for Multimedia Content Description and Analysis", 129. MPEG Meeting, Jan. 13, 2020-Jan. 17, 2020, Brussels, (Motion Picture Expert Group or ISO/IEC JTC1/SC29/WG11), No. n18992, Feb. 20, 2020 (Feb. 20, 2020), 38 Pages, XP030285327, w18992_NN_compression_WD3.docx [retrieved on Feb. 20, 2020] Abstract, Sections 1, 2, 3.

* cited by examiner

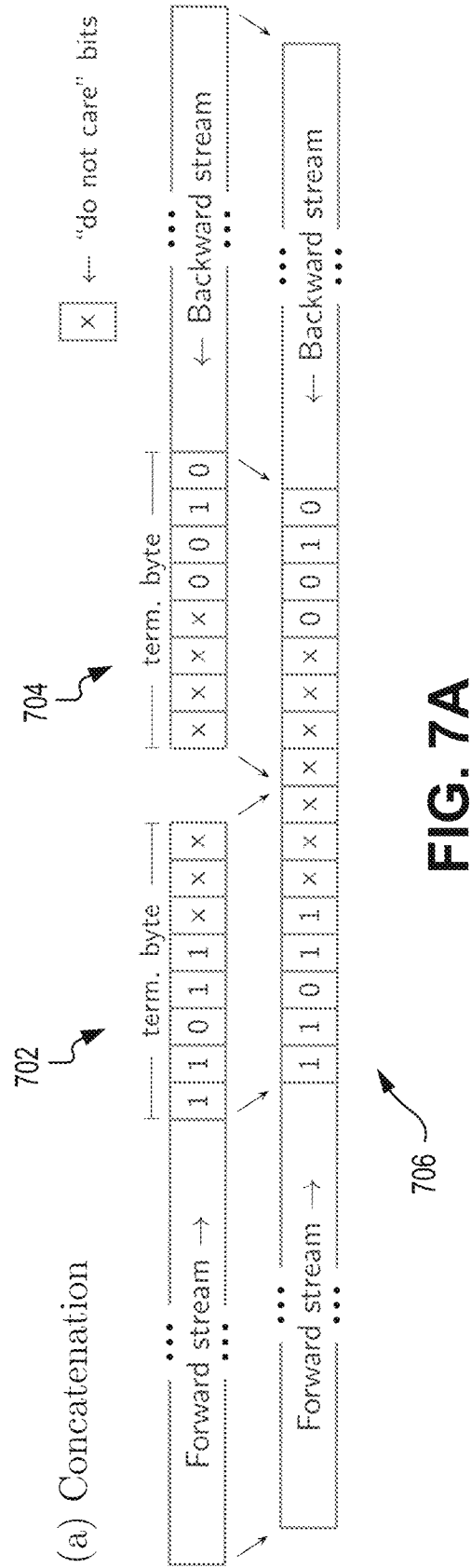
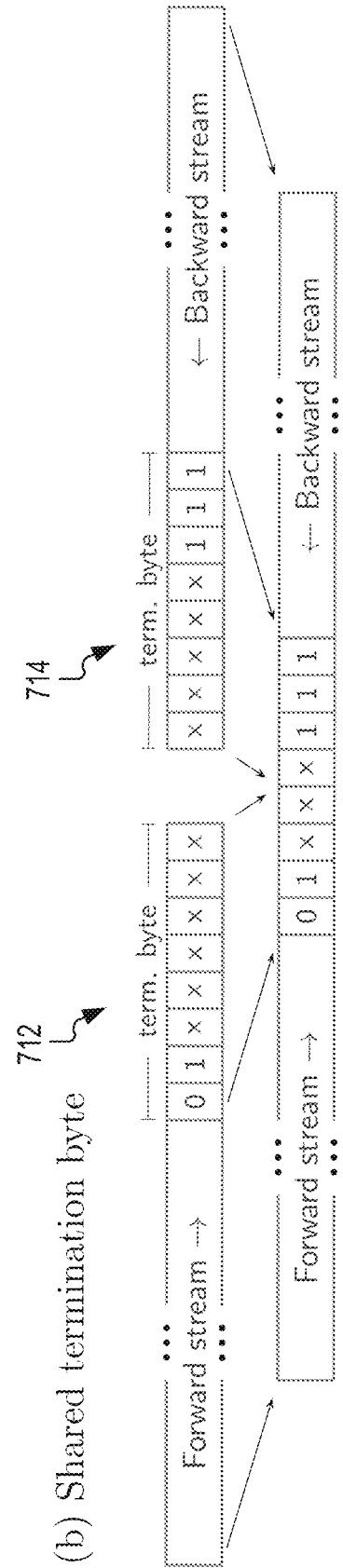
FIG. 7A
FIG. 7B

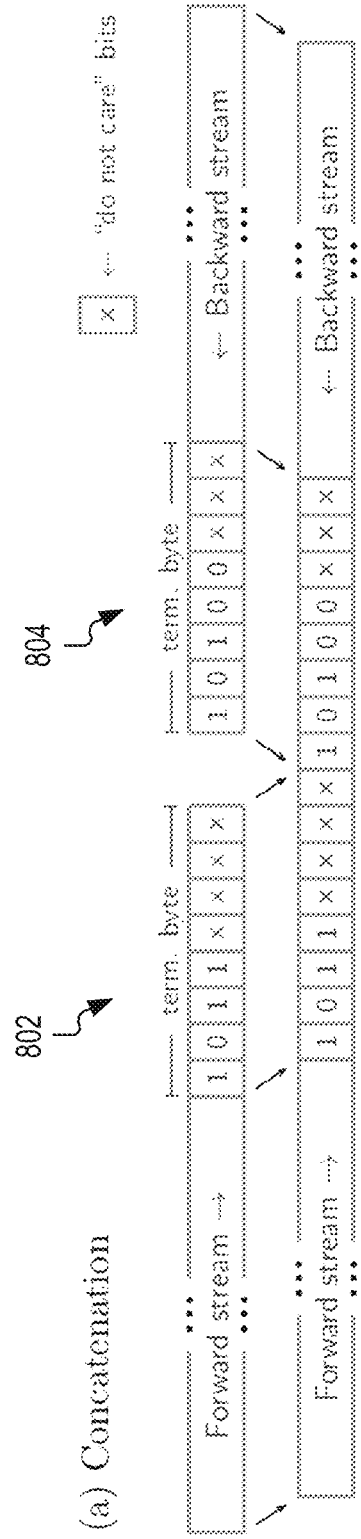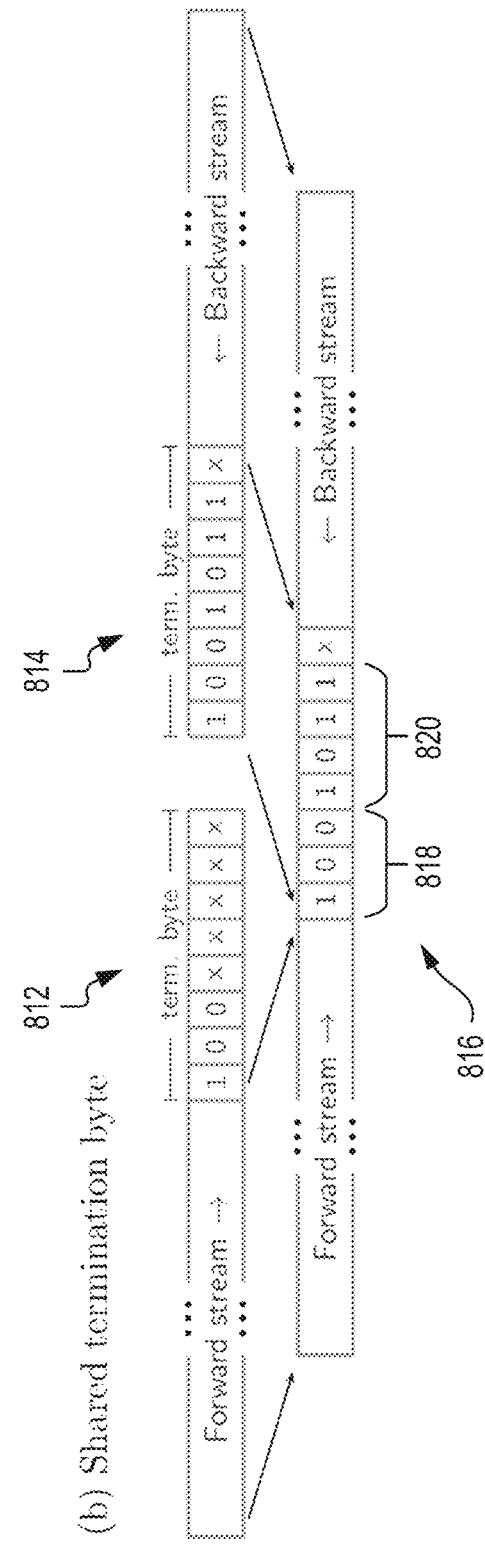
FIG. 8A
FIG. 8B

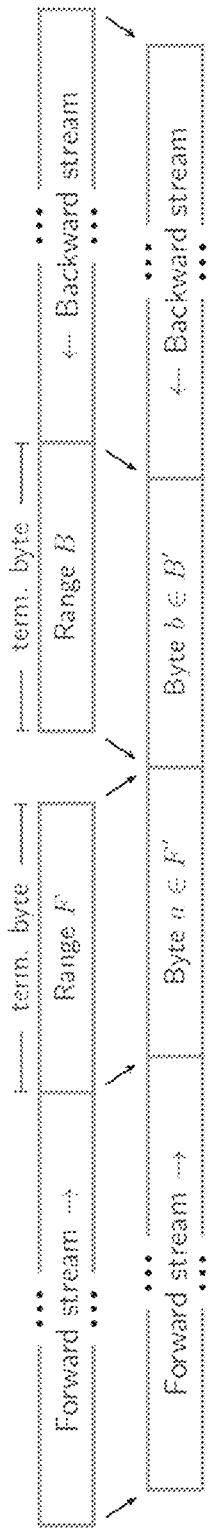
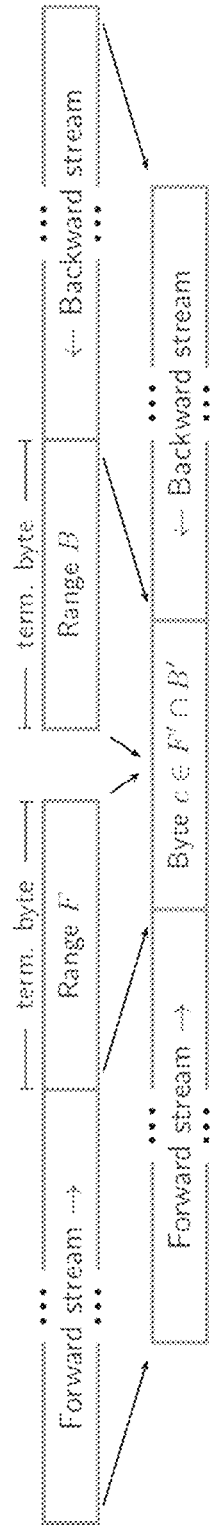

1400

```
┌─────────────────────────────────────────────────────────┐
│  Obtain A First Parcel Of Entropy Coded Data And A Second │
│  Parcel Of Entropy Coded Data, The First Parcel And The Second │
│   Parcel Sharing A Joint Termination Byte, Wherein Values For │
│    The Joint Termination Byte Are Based On An Intersection Of │
│  Values Between Values For A First Termination Byte Of The First │
│   Parcel And Values Of A Second Termination Byte Of The Second │
│                         Parcel                            │
│                          1402                             │
└─────────────────────────────────────────────────────────┘
                             │
                             ▼
┌─────────────────────────────────────────────────────────┐
│  Perform Parallel Entropy Decoding Of The First Parcel And The │
│   Second Parcel Using The Joint Termination Byte For The First │
│                Parcel And The Second Parcel                │
│                          1404                             │
└─────────────────────────────────────────────────────────┘
```

FIG. 14

JOINT TERMINATION OF BIDIRECTIONAL DATA BLOCKS FOR PARALLEL CODING

CROSS-REFERENCE TO RELATED APPLICATIONS

This application claims the benefit of, and priority to, U.S. Provisional Patent Application No. 63/092,443, filed on Oct. 15, 2020, the contents of which are hereby expressly incorporated by reference in its entirety.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content. In one illustrative example, a method of processing video data is provided. The method includes: obtaining encoded video data; determining an intersection of values between values for a first termination byte of a first parcel of the encoded video data and values of a second termination byte of a second parcel of the encoded video data; determining a joint termination byte for the first termination byte of the first parcel and the second termination byte of the second parcel, wherein values for the joint termination byte are based on the intersection of values; and generating entropy coded data including the joint termination byte for the first parcel and the second parcel.

In another example, an apparatus for processing video data is provided that includes a memory configured to store video data and a processor (e.g., implemented in circuitry) coupled to the memory. In some examples, more than one processor can be coupled to the memory and can be used to perform one or more of the operations. The one or more processors are configured to: obtain encoded video data; determine an intersection of values between values for a first termination byte of a first parcel of the encoded video data and values of a second termination byte of a second parcel of the encoded video data; determine a joint termination byte for the first termination byte of the first parcel and the second termination byte of the second parcel, wherein values for the joint termination byte are based on the intersection of values; and generate entropy coded data including the joint termination byte for the first parcel and the second parcel.

In another example, a non-transitory computer-readable medium is provided, which has stored thereon instructions that, when executed by one or more processors, cause the one or more processors to: obtain encoded video data; determine an intersection of values between values for a first termination byte of a first parcel of the encoded video data and values of a second termination byte of a second parcel of the encoded video data; determine a joint termination byte for the first termination byte of the first parcel and the second termination byte of the second parcel, wherein values for the joint termination byte are based on the intersection of values; and generate entropy coded data including the joint termination byte for the first parcel and the second parcel.

In another example, an apparatus for processing video data is provided. The apparatus includes: means for obtaining encoded video data; determining an intersection of values between values for a first termination byte of a first parcel of the encoded video data and values of a second termination byte of a second parcel of the encoded video data; means for determining a joint termination byte for the first termination byte of the first parcel and the second termination byte of the second parcel, wherein values for the joint termination byte are based on the intersection of values; and means for generating entropy coded data including the joint termination byte for the first parcel and the second parcel.

In some aspects, the entropy coded data is generated using arithmetic coding.

In some aspects, the values for the first termination byte include a first range of termination byte values allowed for decoding, the values for the second termination byte include a second range of termination byte values allowed for decoding, and the intersection of values includes values that are in the first range and the second range.

In some aspects, the entropy coded data is generated using binary coding.

In some aspects, the values for the first termination byte include a first number of bits, the values for the second termination byte include a second number of bits, and the intersection of values includes common values that are in the first number of bits and the second number of bits and at least one of a subset of values from the first number of bits and a subset of values from the second number of bits. In some cases, an order of the first number of bits and an order of the second number of bits is unchanged in the joint termination byte as compared to an order of the first number of bits in the first termination byte and an order of the second number of bits in the second termination byte.

In some aspects, generating the entropy coded data includes performing parallel entropy encoding of the first parcel and the second parcel.

In some aspects, the first parcel is encoded using a first encoder, and the first parcel is encoded using a second encoder.

In some aspects, the methods, apparatuses, and computer-readable medium described above comprise: storing the first parcel in a first buffer; and storing the second parcel in a second buffer.

In some aspects, the methods, apparatuses, and computer-readable medium described above comprise: transmitting a bitstream including the entropy coded data.

In some aspects, the methods, apparatuses, and computer-readable medium described above comprise: storing a bitstream including the entropy coded data.

In some aspects, the methods, apparatuses, and computer-readable medium described above comprise: performing parallel entropy decoding of the first parcel and the second parcel using the joint termination byte for the first parcel and the second parcel.

In some aspects, the methods, apparatuses, and computer-readable medium described above comprise: reading the first parcel in a forward order; and reading the second parcel in a backward order.

In some aspects, the methods, apparatuses, and computer-readable medium described above comprise: converting bytes of the second parcel to a reverse order.

In some aspects, the joint termination byte is a final termination byte of the first parcel and the second parcel for processing.

In some aspects, the encoded video data comprises one or more syntax elements of a video bitstream. In some aspects, the one or more syntax elements are indicative of one or more parameters defining a neural network for decoding the encoded video data. In some aspects, the one or more parameters defining the neural network comprise at least one of weights of the neural network and an activation function of the neural network.

In another illustrative example, a method of processing video data is provided. The method includes: obtaining a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and performing parallel entropy decoding of the first parcel and the second parcel using the joint termination byte for the first parcel and the second parcel.

In another example, an apparatus for processing video data is provided that includes a memory configured to store video data and a processor (e.g., implemented in circuitry) coupled to the memory. In some examples, more than one processor can be coupled to the memory and can be used to perform one or more of the operations. The one or more processors are configured to: obtain a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and perform parallel entropy decoding of the first parcel and the second parcel using the joint termination byte for the first parcel and the second parcel.

In another example, a non-transitory computer-readable medium is provided, which has stored thereon instructions that, when executed by one or more processors, cause the one or more processors to: obtain a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and perform parallel entropy decoding of the first parcel and the second parcel using the joint termination byte for the first parcel and the second parcel.

In another example, an apparatus for processing video data is provided. The apparatus includes: means for obtaining a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and means for performing parallel entropy decoding of the first parcel and the second parcel using the joint termination byte for the first parcel and the second parcel.

In some aspects, the entropy coded data is encoded using arithmetic coding.

In some aspects, the values for the first termination byte include a first range of termination byte values allowed for decoding, the values for the second termination byte include a second range of termination byte values allowed for decoding, and the intersection of values includes values that are in the first range and the second range.

In some aspects, the entropy coded data is generated using binary coding.

In some aspects, the values for the first termination byte include a first number of bits, the values for the second termination byte include a second number of bits, and the intersection of values includes common values that are in the first number of bits and the second number of bits and at least one of a subset of values from the first number of bits and a subset of values from the second number of bits.

In some aspects, an order of the first number of bits and an order of the second number of bits is unchanged in the joint termination byte as compared to an order of the first number of bits in the first termination byte and an order of the second number of bits in the second termination byte.

In some aspects, the methods, apparatuses, and computer-readable medium described above comprise: obtaining the first parcel from a first buffer; and obtaining the second parcel from a second buffer.

In some aspects, the methods, apparatuses, and computer-readable medium described above comprise: reading the first parcel in a forward order; and reading the second parcel in a backward order.

In some aspects, the methods, apparatuses, and computer-readable medium described above comprise: converting bytes of the second parcel to a reverse order.

In some aspects, the joint termination byte is a final termination byte of the first parcel and the second parcel for processing.

In some aspects, the methods, apparatuses, and computer-readable medium described above comprise: receiving a video bitstream, the video bitstream including the first parcel, the second parcel, and one or more syntax elements. In some aspects, the one or more syntax elements are indicative of one or more parameters defining a neural network for decoding the encoded video data. In some aspects, the one or more parameters defining the neural network comprise at least one of weights of the neural network and an activation function of the neural network.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 7A is a diagram illustrating an example of byte terminations in bidirectional byte packing when bits are written in reverse order within a byte in the backward stream, where byte concatenation is used, in accordance with some examples;

FIG. 7B is a diagram illustrating an example of byte terminations in bidirectional byte packing when bits are written in reverse order within a byte in the backward stream, where bits are copied to a shared termination byte if there is no overlap in the used bit positions, in accordance with some examples;

FIG. 8A is a diagram illustrating an example of byte terminations in bidirectional byte packing when bits are written in the same order for both streams, where byte concatenation is used, in accordance with some examples;

FIG. 8B is a diagram illustrating an example of byte terminations in bidirectional byte packing when bits are written in the same order for both streams, where bits are copied to a shared termination byte if the first bit values are identical, in accordance with some examples;

FIG. 10A is a diagram illustrating an example of bidirectional byte packing of arithmetic coded streams, defined by sets of allowable termination bytes, where no intersection exists between sets, in accordance with some examples;

FIG. 10B is a diagram illustrating an example of bidirectional byte packing of arithmetic coded streams, defined by sets of allowable termination bytes, where one byte in the intersection is used for shared termination, in accordance with some examples;

FIG. 14 is a flowchart illustrating another example of a process for processing video data, in accordance with some examples;

DETAILED DESCRIPTION

Figure 1:
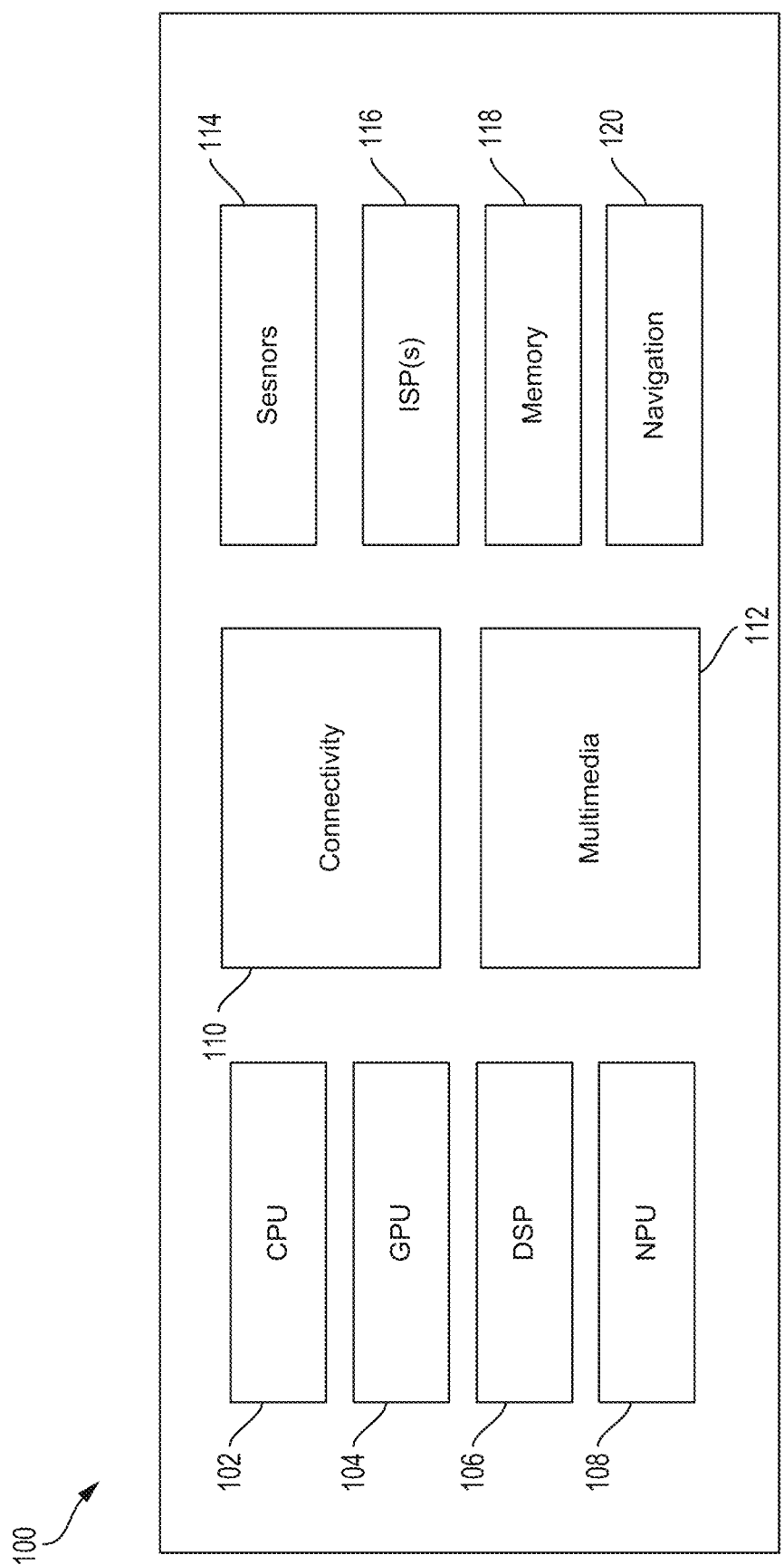
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding Standard or can be performed using one or more machine learning systems or algorithms. Example video coding Standards include versatile video coding (VVC), high-efficiency video coding (HEVC), advanced video coding (AVC), moving picture experts group (MPEG) coding (e.g., MPEG-5 Essential Video Coding (EVC) or other MPEG-based coding), AOMedia Video 1 (AV1), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of a video frame buffer targeted to a process.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Arithmetic coding is used by many video compression Standards, including VVC, HEVC, VP9, and AV1. Such wide use is due, at least in part, to arithmetic coding enabling powerful data modeling and yielding compression that is very close to theoretical limits. One problem with using arithmetic coding for video coding/compression is that, as video resolutions and frame rates continue to increase, sequential coding creates a throughput bottleneck that can increase costs to a point reaching the limits of current hardware. One solution to offset such a problem is to employ parallelization by, for example, dividing the bitstream into independent data blocks that can be processed concurrently. Further, new coding (encoding and decoding) methods based on machine learning techniques (e.g., using neural networks or other machine learning tools) are being developed to satisfy coding requirements. Such machine learning techniques can also employ arithmetic coding and/or parallelization. While dividing the bitstream into data blocks enables concurrent processing of the data, it can severely degrade compression. For example, when arithmetic coding is terminated, extra bits are needed to guarantee correct decoding and in some cases for padding to the next byte boundary.

As described in more detail below, systems, apparatuses, methods (also referred to as processes), and computer-readable media (collectively referred to as "systems and techniques") are described herein for performing arithmetic coding (e.g., encoding, decoding, or both encoding and decoding). The systems and techniques described herein can significantly reduce the above-noted overhead and resulting compression loss. In some cases, aspects of the systems and techniques described herein are based on the discovery that, with a form of bidirectional data packing that is more efficient for split bitstreams, it is possible to jointly optimize the termination of pairs of arithmetic coding bitstreams, leading to a significantly more efficient result than conventional termination. Theoretical analysis and the simulation of realistic coding conditions are provided below and confirm the effectiveness of the proposed systems and techniques.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using Standards-based video coding and/or using machine learning techniques. Examples of Standards-based and machine learning-based video coding systems are described with respect to FIG. 2 and FIG. 3.

Figure 2:
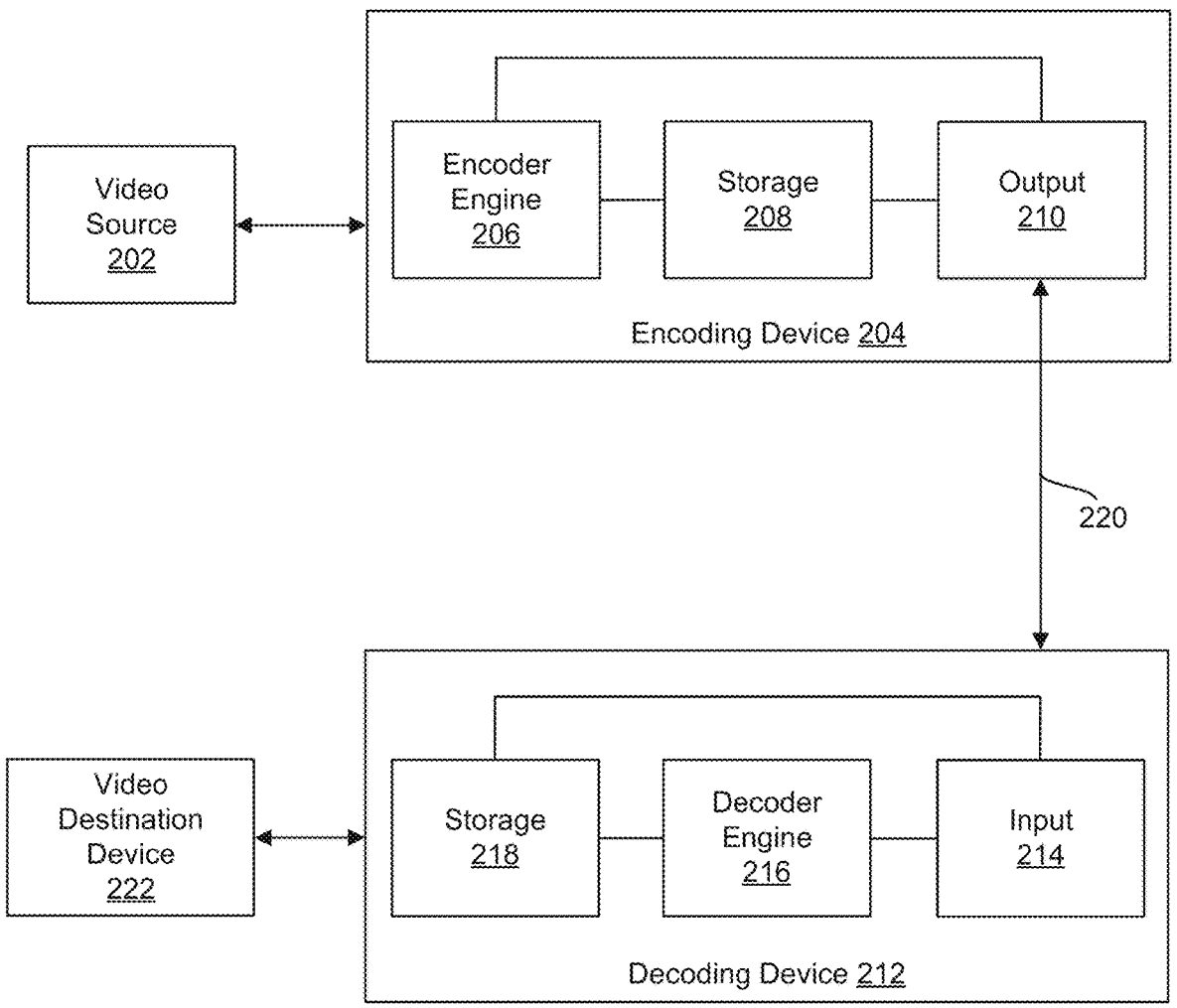
FIG. 2 is a block diagram illustrating an encoding device and a decoding device, in accordance with some examples.

FIG. 2 is a block diagram illustrating an example of a system 200 including an encoding device 204 and a decoding device 212 that can respectively encode and decode video data accordance with examples described herein. In some examples, the encoding device 204 and/or the decoding device 212 can include the SOC 100 of FIG. 1. The encoding device 204 may be part of a source device, and the decoding device 212 may be part of a receiving device (also referred to as a client device). In some examples, the source device can also include a decoding device similar to the decoding device 212. In some examples, the receiving device can also include an encoding device similar to the encoding device 204. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include the SOC 100 and/or one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, NPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, and/or video telephony.

In some examples, the encoding device 204 (or encoder) can be used to encode video data using a video coding Standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, Versatile Video Coding (VVC) or ITU-T H.266, and/or other video coding Standards. One or more of the video coding Standards have extensions associated with other aspects of video coding. For instance, various extensions to HEVC deal with multi-layer video coding, including the range and screen content coding extensions, 3D video coding (3D-HEVC) and multiview extensions (MV-HEVC) and scalable extension (SHVC).

Many embodiments described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed, such as the machine learning based video coding described below. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. According to HEVC, a coded video sequence (CVS) includes a series of access units (AUs) starting with an AU that has a random access point picture in the base layer and with certain properties (e.g., a RASL flag (e.g., NoRaslOutputFlag) equal to 1) up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to HEVC, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 206.

Once the pictures of the video data are partitioned into CUs, the encoder engine 206 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

As noted above, in some cases the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 206 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may transform the TUs to produce transform coefficients for the CU. The TUs may comprise coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may rescale and perform an inverse transform on the encoded video bitstream data. Residual data is passed to a prediction stage of the decoder engine 216. The decoder engine 216 predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some embodiments, the video encoding device 204 and/or the video decoding device 212 may be integrated with an audio encoding device and audio decoding device, respectively. The video encoding device 204 and/or the video decoding device 212 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As noted above, in some examples, the SOC 100 and/or components thereof may be configured to perform video compression and/or decompression (also referred to as video encoding and/or decoding, collectively referred to as video coding) using machine learning techniques. For instance, the encoding device 204 (or encoder) can be used to encode video data using a machine learning system with a deep learning architecture (e.g., by utilizing the NPU 108 of the SOC 100 of FIG. 1). In some cases, using deep learning architectures to perform video compression and/or decompression can increase the efficiency of video compression and/or decompression on a device. For example, the encoding device 204 can use a machine learning based video coding technique to compress video more efficiently, can transmit the compressed video to the decoding device 212, and the decoding device 212 can decompress the compressed video using the machine learning based techniques.

A neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 15A-FIG. 16.

Figure 3:
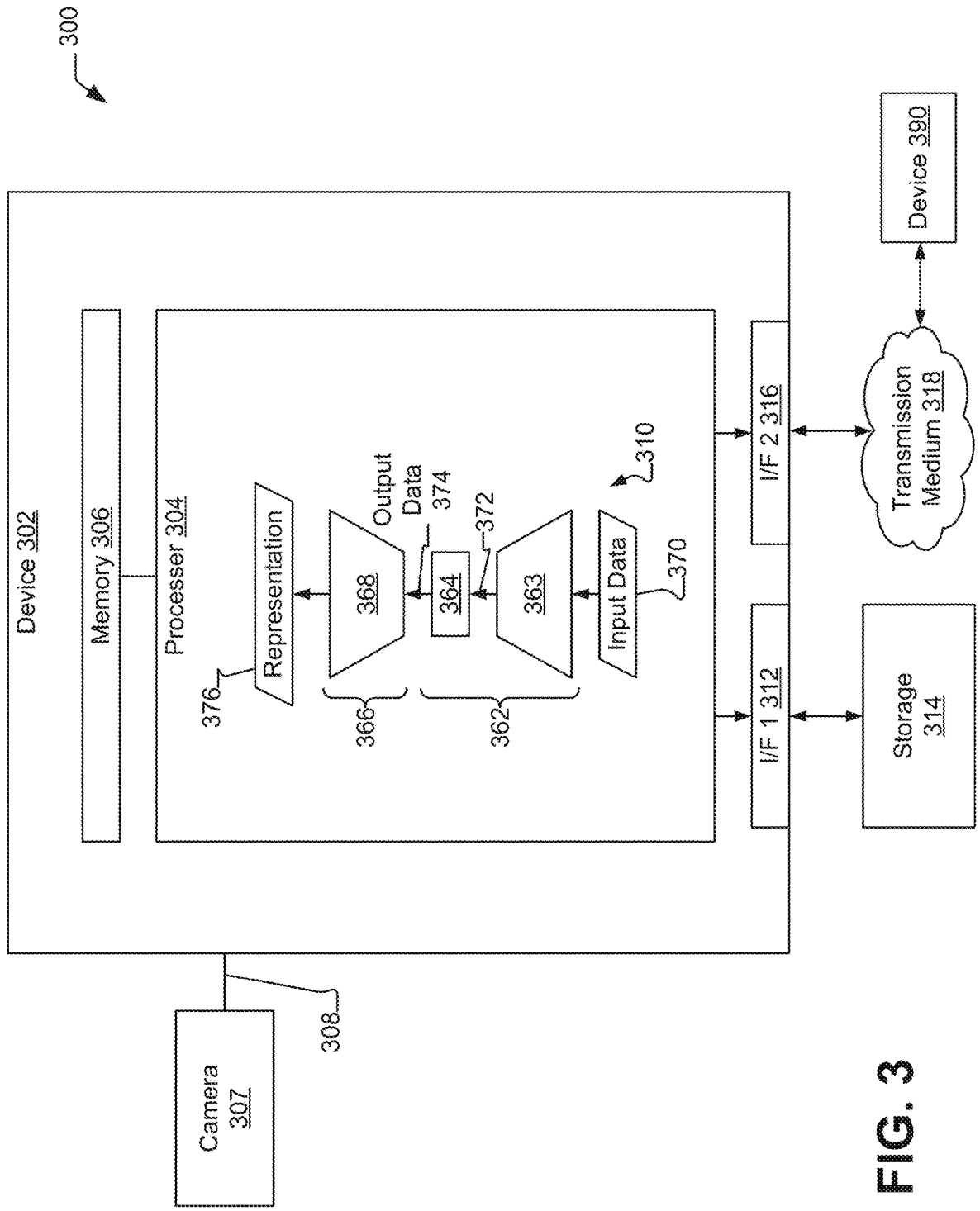
FIG. 3 is a diagram illustrating an example of a system including a device operable to perform image and/or video coding (encoding and decoding) using a neural network-based system, in accordance with some examples.

FIG. 3 depicts a system 300 that includes a device 302 configured to perform video encoding and decoding using a machine learning coding system 310. The device 302 is coupled to a camera 307 and a storage medium 314 (e.g., a data storage device). In some implementations, the camera 307 is configured to provide the image data 308 (e.g., a video data stream) to the processor 304 for encoding by the machine learning coding system 310. In some implementations, the device 302 can be coupled to and/or can include multiple cameras (e.g., a dual-camera system, three cameras, or other number of cameras). In some cases, the device 302 can be coupled to a microphone and/or other input device (e.g., a keyboard, a mouse, a touch input device such as a touchscreen and/or touchpad, and/or other input device). In some examples, the camera 307, the storage medium 314, microphone, and/or other input device can be part of the device 302.

The device 302 is also coupled to a second device 390 via a transmission medium 318, such as one or more wireless networks, one or more wired networks, or a combination thereof. For example, the transmission medium 318 can include a channel provided by a wireless network, a wired network, or a combination of a wired and wireless network. The transmission medium 318 may form part of a packet-based network, such as a local area network, a wide-area network, or a global network such as the Internet. The transmission medium 318 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 302 includes one or more processors (referred to herein as "processor") 304 coupled to a memory 306, a first interface ("I/F 1") 312, and a second interface ("I/F 2") 316. The processor 304 is configured to receive image data 308 from the camera 307, from the memory 306, and/or from the storage medium 314. The processor 304 is coupled to the storage medium 314 via the first interface 312 (e.g., via a memory bus) and is coupled to the transmission medium 318 via the second interface 316 (e.g., a network interface device, a wireless transceiver and antenna, one or more other network interface devices, or a combination thereof).

The processor 304 includes the machine learning coding system 310. The machine learning coding system 310 includes an encoder portion 362 and a decoder portion 366. In some implementations, the machine learning coding system 310 can include one or more auto-encoders. The encoder portion 362 is configured to receive input data 370 and to process the input data 370 to generate output data 374 at least partially based on the input data 370.

In some implementations, the encoder portion 362 of the machine learning coding system 310 is configured to perform lossy compression of the input data 370 to generate the output data 374, so that the output data 374 has fewer bits than the input data 370. The encoder portion 362 can be trained to compress input data 370 (e.g., images or video frames) without using motion compensation based on any previous representations (e.g., one or more previously reconstructed frames). For example, the encoder portion 362 can compress a video frame using video data only from that video frame, and without using any data of previously reconstructed frames. Video frames processed by the encoder portion 362 can be referred to herein as intra-predicted frame (I-frames). In some examples, I-frames can be generated using traditional video coding techniques (e.g., according to HEVC, VVC, MPEG-4, or other video coding Standard). In such examples, the processor 304 may include or be coupled with a video coding device (e.g., an encoding device) configured to perform block-based intra-prediction, such as that described above with respect to the HEVC Standard. In such examples, the machine learning coding system 310 may be excluded from the processor 304.

In some implementations, the encoder portion 362 of the machine learning coding system 310 can be trained to compress input data 370 (e.g., video frames) using motion compensation based on previous representations (e.g., one or more previously reconstructed frames). For example, the encoder portion 362 can compress a video frame using video data from that video frame and using data of previously reconstructed frames. Video frames processed by the encoder portion 362 can be referred to herein as intra-predicted frame (P-frames). The motion compensation can be used to determine the data of a current frame by describing how the pixels from a previously reconstructed frame move into new positions in the current frame along with residual information.

As shown, the encoder portion 362 of the machine learning coding system 310 can include a neural network 363 and a quantizer 364. The neural network 363 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 372. The intermediate data 372 is input to the quantizer 364. The quantizer 364 can be implemented using a machine learning system (e.g., using a neural network system) or can be implemented using a Standards-based quantization and/or entropy coding techniques (e.g., arithmetic coding). For instance, in some cases, the encoder portion 362 can compress the input data 370 using the neural network techniques described herein, and can output the intermediate data 372 to the quantizer 364 for performing Standards-based quantization and/or entropy coding (e.g., arithmetic coding).

The quantizer 364 is configured to perform quantization and in some cases entropy coding of the intermediate data 372 to produce the output data 374. The output data 374 can include the quantized (and in some cases entropy coded) data. The quantization operations performed by the quantizer 364 can result in the generation of quantized codes (or data representing quantized codes generated by the machine learning coding system 310) from the intermediate data 372. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the machine learning coding system 310. In one illustrative example, the machine learning coding system 310 can be trained using supervised training, with residual data being used as input and quantized codes and entropy codes being used as known output (labels) during the training.

The decoder portion 366 of the machine learning coding system 310 is configured to receive the output data 374 (e.g., directly from quantizer 364 and/or from the storage medium 314). The decoder portion 366 can process the output data 374 to generate a representation 376 of the input data 370 at least partially based on the output data 374. In some examples, the decoder portion 366 of the machine learning coding system 310 includes a neural network 368 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures.

The processor 304 is configured to send the output data 374 to at least one of the transmission medium 318 or the storage medium 314. For example, the output data 374 may be stored at the storage medium 314 for later retrieval and decoding (or decompression) by the decoder portion 366 to generate the representation 376 of the input data 370 as reconstructed data. The reconstructed data can be used for various purposes, such as for playback of video data that has been encoded/compressed to generate the output data 374. In some implementations, the output data 374 may be decoded at another decoder device that matches the decoder portion 366 (e.g., in the device 302, in the second device 390, or in another device) to generate the representation 376 of the input data 370 as reconstructed data. For instance, the second device 390 may include a decoder that matches (or substantially matches) the decoder portion 366, and the output data 374 may be transmitted via the transmission medium 318 to the second device 390. The second device 390 can process the output data 374 to generate the representation 376 of the input data 370 as reconstructed data.

The components of the system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 300 is shown to include certain components, one of ordinary skill will appreciate that the system 300 can include more or fewer components than those shown in FIG. 3. For example, the system 300 can also include, or can be part of a computing device that includes, an input device and an output device (not shown). In some implementations, the system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the machine learning coding system 310 can be incorporated into a portable electronic device that includes the memory 306 coupled to the processor 304 and configured to store instructions executable by the processor 304, and a wireless transceiver coupled to an antenna and to the processor 304 and operable to transmit the output data 374 to a remote device.

As described above, entropy coding is one of the final stages (and in some cases the final stage) of encoding (compression), defining the value and number of bits to be added to the compressed data bitstream. Modern Standards-based video encoding methods (e.g., VVC, HEVC, AV1, etc.) employ adaptive arithmetic coding to enable high quality compression performance. Bitstreams generated by adaptive arithmetic coding can only be encoded and decoded sequentially. For example, a data element can only be recovered by first decoding all previous elements, since the decoder needs to reach the same state the encoder had when it coded that element.

Parallel entropy coding can be performed, where throughput requirements are divided to be processed by less-complex circuitry. To enable parallel entropy coding, the compressed data is separated into independently encoded bitstream segments, which can be encoded and decoded concurrently. Such independently encoded bitstream segments are referred to herein as data parcels or parcels. It is assumed that a parcel can be decoded without information from any other parcel (this requirement is with respect to the decoding process; the interpretation of the data in a parcel can depend on information from another parcel), and that each parcel is extended to an integer number of bytes.

Whenever there is more than one bitstream to be decoded concurrently, in addition to using the compressed data, information indicating entry points (e.g., the byte positions from where decoding can start) can be provided for decoding. The data structure including the entry points is referred to herein as a parcel index. In some cases, the parcel index including the entry points can be included in a header of the video data, in a parameter set (e.g., a video parameter set (VPS), a sequence parameter set (SPS), a picture parameter set (PPS), etc.), and/or in any other message or signaling associated with the video data.

Bidirectional byte packing is one technique that can be used for processing parcels. For instance, bidirectional byte packing can be used to reduce the number of entry points that need to be specified in a parcel index. Bidirectional byte packing is based on the fact that the position of entry points must be known before decoding starts, but the termination position does not need to be stored.

Figure 4:
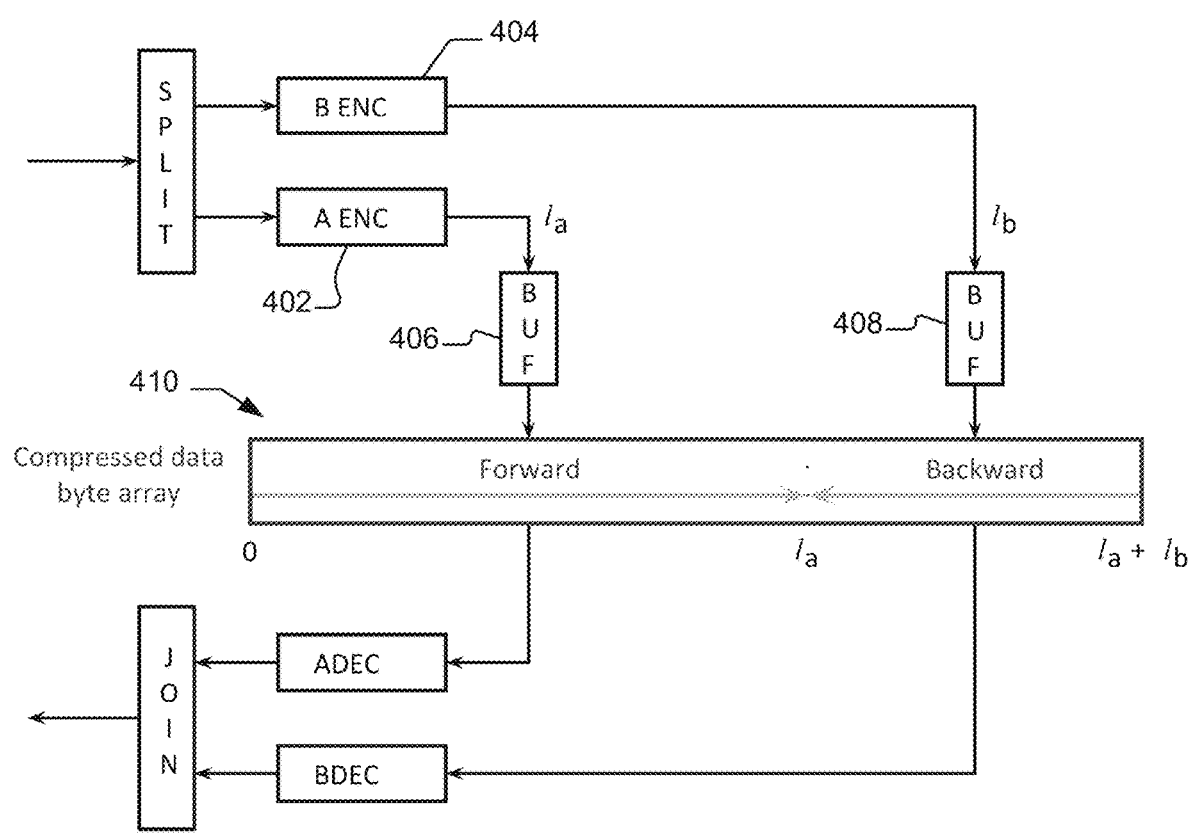
FIG. 4 is a diagram illustrating an example of data organization and coding process for bidirectional byte packing, in accordance with some examples.

FIG. 4 is a diagram illustrating an example of the data organization and coding process for bidirectional byte packing. As shown, data from two encoded bitstreams (including bitstream 402 and bitstream 404) are first saved to memory buffers (including memory buffer 406 for bitstream 402 and memory buffer 408 for bitstream 404). When encoding is finished and the final number of bytes needed for each stream (bytes $l_a$ for bitstream 402 and $l_b$ for bitstream 404) is known, a compressed data byte array 410 with $l_a+l_b$ bytes is created. A forward stream (denoted as "forward" in FIG. 4) is copied starting from the beginning of the compressed data byte array 410 in the conventional increasing byte order (from left to right in FIG. 4), while the backward stream (denoted as "backward" in FIG. 4) is copied starting from the end of the compressed data byte array 410 in the reverse order of byte positions (from right to left in FIG. 4). Because the decoder knows the number of compressed data bytes ($l_a+l_b$), it can start decoding from the beginning and from the end of the compressed data byte array 410 concurrently.

Figure 5:
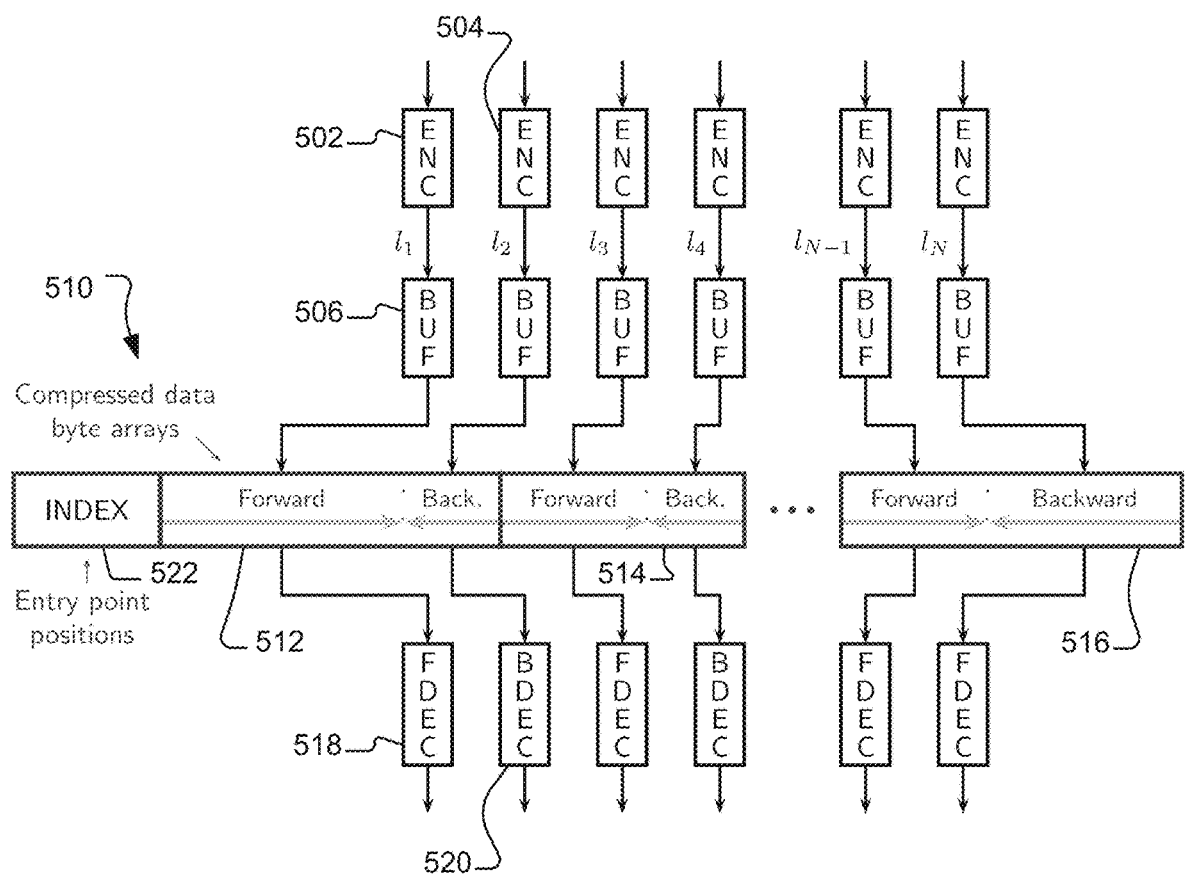
FIG. 5 is a diagram illustrating an example of extending bidirectional byte packing to support parallel entropy encoding and decoding, in accordance with some examples.

FIG. 5 is a diagram illustrating an example of extending the bidirectional byte packing approach to support parallel entropy encoding and decoding. Similar to the example of FIG. 4, an encoded (or compressed) bitstream is divided into several independent parcels (e.g., parcels $l_1$, $l_2$, $l_3$, through $l_N$), for example by multiple encoders (e.g., encoder 502, encoder 504, etc.) or by a single encoder. The independent parcels can be stored in separate buffers (e.g., parcel $l_1$ is stored in buffer 506). Pairs of parcels can be combined using bidirectional byte packing. For instance, bidirectional byte packing can be used to combine parcel $l_1$ and parcel $l_2$, parcel $l_3$ and parcel $l_4$, and so on. The compressed data arrangement of the compressed data byte arrays 510 in FIG. 5 enables parallel entropy coding. The compressed data is organized into multiple bidirectional byte arrays, including bidirectional byte array 512, bidirectional byte array 514, through bidirectional byte array 516.

Multiple decoders (e.g., decoder 518, decoder 520, etc.) are also illustrated in FIG. 5. As shown, a forward decoder (FDEC) and a backward decoder (BDEC) can be used for each bidirectional byte array. For instance, decoder 518 (which is a FDEC) and decoder 520 (which is a BDEC) can be used to decode the bidirectional byte array 512. The FDEC and BDEC decoders may differ only in the order in which they read the compressed data bytes. The compressed data byte arrays 510 are accompanied by a parcel index 522. The parcel index 522 is a data structure that includes an indication of the number of bytes in each parcel (and thus the decoding entry points denoted as "entry point positions"). One technique (referred to as an "NBC" method) that can be used to efficiently code the entry point information is based on the concept that the sequence with the number of bytes in each parcel:

$$\mathcal{L} = (l_1, l_2, l_3, l_4, \ldots, l_{N-1}, l_N), \tag{1}$$

can be encoded with an average number of bits per parcel approximately equal to:

$$B_u \cong \frac{1}{N} \sum_{k=1}^{N} [2 + \log_2(l_k)]. \tag{2}$$

When using bidirectional byte packing, the following sequence instead needs to be encoded (assuming for simplicity that N is even):

$$\mathcal{L}' = (l_1+l_2, l_3+l_4, \ldots, l_{N-1}+l_N). \tag{3}$$

The corresponding average number of bits is:

$$B_d \cong \frac{1}{N} \sum_{i=1}^{N/2} [2 + \log_2(l_{2i-1} + l_{2i})] \cong \frac{3}{2} + \frac{1}{2N} \sum_{k=1}^{N} \log_2(l_k) = \frac{B_u + 1}{2}, \tag{4}$$

which means that bidirectional byte packing can approximately halve the overhead resulting from encoding the parcel index 522.

Arithmetic coding stream termination is one aspect of arithmetic coding. Arithmetic coding is different from other forms of entropy coding for various reasons. For example, arithmetic coding maintains a "range" state (a semi-closed interval) during encoding and decoding that, in an information theory sense, corresponds to a fractional number of pending bits. Also, when the number of fractional bits reaches a certain threshold, an integer number of bits are written to the output stream, and the state is updated to preserve the information corresponding to the fraction of remaining bits. When encoding is finished, it may be necessary to "flush" the pending bits and to add bits to convert the pending information into an integer number of output stream bits. To increase efficiency and to avoid checking for the end-of-stream condition whenever a byte is read, decoders can pre-load several bytes, which eventually include some bytes from beyond the end of the current stream. A goal of stream termination is to guarantee that decoding is correct independently of the value of the bits beyond the stream termination.

Figure 6:
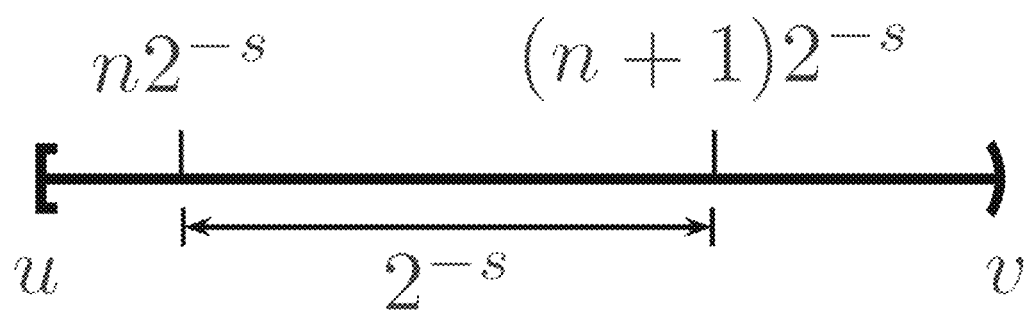
FIG. 6 is a diagram graphically illustrating factors used for correct arithmetic coding termination, in accordance with some examples.

FIG. 6 is a diagram graphically illustrating factors used for correct arithmetic coding termination. In FIG. 6, the interval [u, v) represents the final state of the arithmetic encoder. For example, the interval [u, v) defined by u and v represents a fractional number of bytes (e.g., a data set of 34 bits includes 4.2 bytes, and u and v represent the 0.2 bytes). Any bit values within the interval [u, v) is valid for a termination byte. To simplify the presentation, it can be assumed that an implementation with byte outputs (byte-based renormalization) is used, and that u and v are real numbers such that:

$$0 \leq u < v < 2, 2^{-8} \leq v-u < 1. \tag{5}$$

The minimum number of extra bits needed to guarantee correct decoding is equal to the minimum value of the exponent s that satisfies:

$$u \leq n2^{-s} < (n+1)2^{-s} \leq v, n, s \in \mathbb{N}. \tag{6}$$

The s most significant bits of the termination byte can be defined by:

$$b^* = n2^{8-s}, \tag{7}$$

and the values of the remaining 8−s bits are arbitrary (referred to herein as "do not care bits").

However, when it is possible to choose all the bits in the termination byte, correct decoding is obtained for any termination byte value b that satisfies:

$$b_{min} = \lceil 256u \rceil \leq b \leq b_{max} = \lceil 256v \rceil - 1. \tag{8}$$

There are some special cases, such as those related to carry operations and the need for an additional byte when s>8.

It is noted that:

$$s \geq -\log_2(v-u), \tag{9}$$

and because v−u<1, the condition s≥1 always holds (there is always at least one additional bit that needs to be added to the output stream).

The overhead incurred is different for each termination, and equal to s+log$_2$ (v−u). The average value can be computed from coding simulations. For a high precision implementation, the mean value can be measured as being equal to:

$$\overline{O}_{act} = E\{s + \log_2(v-u)\} = 1.057 \text{ bits.} \tag{10}$$

As noted above, systems and techniques are described herein that can reduce such overhead and resulting compression loss. For example, the systems and techniques address the bit overhead that occurs when the encoding of a parcel finishes. Further, file and data stream formats require bits to be grouped into 8-bit bytes, in which case there is an additional overhead defined by the byte boundaries in addition to the overhead associated with the parcel index and coding termination. With unidirectional byte packing, the average overhead (e.g., based on unused bits) per data parcel is (here, the additional bits needed to correctly terminate arithmetic encoding are not taken into account; such additional bits have to be added to this value to obtain the total average overhead per parcel):

$$\overline{O}_{ud} = \frac{1}{8}(0+1+2+ \ldots +7) = 3.5 \text{ bits.} \tag{11}$$

There are two choices associated with bidirectional byte packing. A first option is to concatenate the bytes and have the same average overhead per parcel. FIG. 7A is a diagram illustrating an example of concatenating bytes. For example, as shown in FIG. 7A, a first termination byte 702 includes values of 11011 and a second termination byte 704 includes values of 0010. The bits identified with an "x" are referred to as "do not care" bits. In one illustrative example, video data can be coded with 37 bits. A byte includes eight bits. In the illustrative example of video coded with 37 bits, there will be four bytes (including 32 total bits) and five bits left over. The five bits that are left over and the three "do not care" bits can be included in a byte (e.g., the bit values 11011 and the "xxx" bits included in the first termination byte 702 of FIG. 7A). The encoder and/or decoder can (and in some cases must) write and/or read all five 8-bit bytes including the last one that includes the "do not care" bits, but the decoder will parse the bits only up to the "do not care" bits, and for this reason the encoder can set those bits to any value. As illustrated by the bitstream 706, the first termination byte 702 is concatenated with the second termination byte 704.

A second option is to encode the bits in the backward streams also in reverse order within each byte, so that a single shared termination byte (also referred to as a joint termination byte) can be used when the pattern of used bits do not overlap. This is in contrast to the example of FIG. 7A, where two bytes are used in the bitstream 706. FIG. 7B is a diagram illustrating an example of using a shared termination byte 716. For example, as shown in FIG. 7B, the shared termination byte 716 includes bits 0 and 1 from a first termination byte 712, bits 1, 1, and 1 from a second termination byte 714, and three do not care bits. Because there are five bits total from the first termination byte 712 and the second termination byte 714 (less than eight bits), the bits can be combined into the shared termination byte 716.

When the second option is used (e.g., as shown in FIG. 7B), the fraction of termination bytes that are shared is:

$$R_{rb} = 7/16 = 43.75\%, \tag{12}$$

and the average overhead per parcel is reduced to:

$$\overline{O}_{bd} = \frac{\overline{O}_{ud}}{2} = 1.75 \text{ bits.} \tag{13}$$

The systems and techniques described herein present new solutions to the above-noted problems, and in some cases consider the application for wide scale parallelization (when the termination overhead is important) and for at least two cases. In a first case, writing bits in reverse order within a byte can be relatively easy when encoding "raw" bits, but it is not always convenient. For instance, with arithmetic coding, the order of the bits comes from arithmetic operations, and thus, for the backward stream, each byte must have its bits reversed before writing and after reading. In a second case, as explained below, the correct termination of arithmetic coding is not unique. With unidirectional byte packing there are no advantages for choosing among the many correct options. However, as described below, with bidirectional byte packing, a subset of the choices allows sharing of the termination byte, and thus reduces the average overhead.

In some cases, the systems and techniques described herein can apply to joint binary coding termination. For instance, when the same convention for filling bits within bytes is used in the forward and backward streams, the concept of shared termination bytes can be used. FIG. 8A is a diagram illustrating an example of using concatenation and FIG. 8B is a diagram illustrating an example of using a shared termination byte using the techniques described herein. For example, a byte value can be shared if the bit positions that are used for both streams (e.g., for both termination bytes of both streams) have the same bit values and the resulting shared termination byte does not change the order of the bits of the termination bytes of the forward and backward streams. In some cases, an encoder can determine that a shared termination byte can be used based on determining that bit positions that are used in a first termination byte of a first parcel (for a forward stream) and the bit positions that are used in a second termination byte of a second parcel (for a reverse stream) have the same (or common) bit values and the resulting shared termination byte does not change the order of the bits of the first and second termination bytes. In some examples, the encoder can determine that bit positions in the first termination byte have common values as the bit positions in the second termination byte by determining an intersection of the values of the first and second termination bytes. The encoder can include the common bit values (e.g., which are found to intersect) in the shared termination byte, followed by the other values of the first and second termination bytes.

In the example of FIG. 8A, three bit positions are used in both a first termination byte 802 of the forward stream and a second termination byte 804 of the backward stream, including the values of the first three bit positions (values "101"). However, if a shared termination byte were used, the resulting bits in the shared termination byte would be "101100," which changes the order of the bits in the second termination byte 804 of the backward stream (which has values "10100"). The order of the bits in each termination byte must be maintained so that correct decoding can be performed by a decoder.

In FIG. 8B, three bit positions are used in both a first termination byte 812 of the forward stream and a second termination byte 814 of the backward stream, including the values of the first three bit positions (values "100"). Because both the first termination byte 812 and the second termination byte 814 have the first three bit values equal to "100", the termination byte can be shared (in a shared termination byte 816) if the bit values in all the occupied positions are copied and the order of the bits in the termination bytes 812 and 814 are maintained (or unchanged). Such a condition is present in the example of FIG. 8B. A first group of bits 818 (with values "100") of the shared termination byte 816 include the three common bits (the first three bits) from the first termination byte 812 and the second termination byte 814. The next group of bits 820 (with values "1011") includes the bits from the second termination byte 814 that are unique (not common) with respect to the first termination byte 812. The final bit of the shared termination byte 816 is a "do not care" bit (represented by an "x"). As shown, the orders of the bits in termination byte 812 ("100") from the forward stream and the bits in the termination byte 814 ("1001011") from the backward stream are maintained in the shared termination byte 816.

The decoder is aware of where the bits for the termination byte 812 (of the forward stream) are in the shared termination byte 816 and where the bits for the termination byte 814 (of the backward stream) are in the shared termination byte 816. For instance, the bits are processed by the decoder according to the data being read and its interpretation. In one illustrative example, a decoder can be defined in a way that it is going to read exactly 1024 values, and each value is entropy coded with a different number of bits, according to the values (e.g., value 0 coded using 2 bits, values +1, −1 coded with 4 bits, etc.). Since the decoder must know how many bits are used for each value, the decoder is aware that it has reached the end of a particular stream (e.g., the end of the forward stream and thus the end of the termination byte 812, the end of the backward stream and thus the end of the termination byte 814, etc.) after it decodes values numbered 1024. Continuing with such an example, there can be two arrays of 1024 values, which are coded independently in the same manner, and put together using the bidirectional packing. The decoder of each stream can decode its own set of 1024 values, and can process bits sequentially. Each decoder will finish when the decoder has decoded 1024 values. In some cases, decoders do not know a priori how many bits to read, but the number of data elements they have to decode is well defined, in which case decoders can continue to read bits from an input stream until the point where they know they have to stop.

The technique illustrated in FIG. 8B depends on the event of groups of random bit values being equal. Such coincidences are most common for the cases where the number of "do not care" bits (or "wasted bits") is largest. For example, if there is only one additional bit in each stream, in 50% of the cases the termination byte can be shared. This can mean that, instead of always having 14 unused bits for those cases, in half the cases there can be 7 unused bits, for an average of 10.5 unused bits. The exact fraction of termination bytes that can be shared can be illustrated as follows:

$$R_{mb} = \frac{1}{64}\sum_{i=0}^{7}(2i+1)2^{i-8} = \frac{3{,}331}{2^{14}} = 20.33\%, \qquad (14)$$

and the average overhead per parcel can be computed as:

$$\overline{O}_m = \overline{O}_{ud} - \frac{8R_{mb}}{2} = \frac{11{,}005}{2^{12}} = 2.69 \text{ bits}. \qquad (15)$$

In some cases, the systems and techniques described herein can apply to joint arithmetic coding termination (with the same bit order). For example, if the termination of arithmetic coding is performed using equation (7) from above, then it is straightforward to use the techniques described with respect to equations (11)-(13) and FIG. 7A-FIG. 7B and/or the techniques described with respect to FIG. 8A-FIG. 8B, and use shared termination bytes based on the concept of "do not care" bits.

Figure 9A:
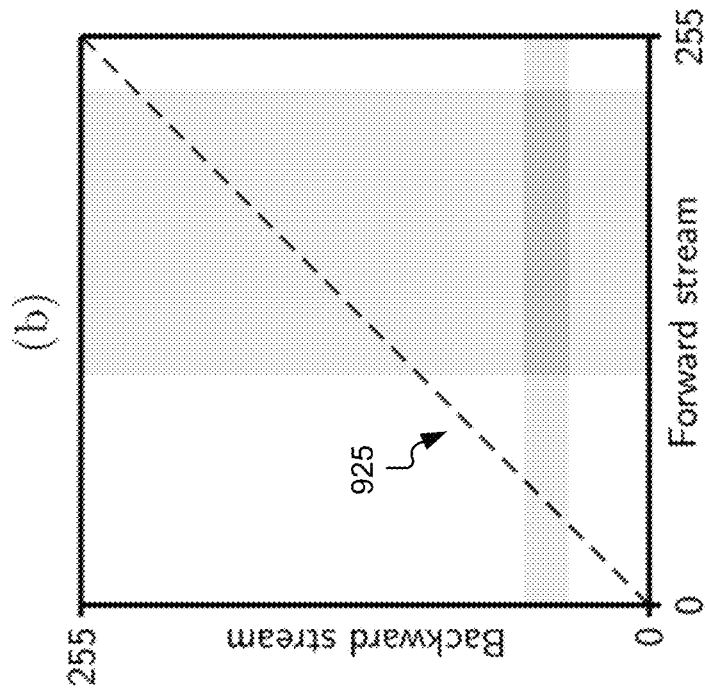
FIG. 9A is a diagram illustrating an example of a range of valid arithmetic coding termination byte values (gray regions) and equal values (dashed line), where a non-empty intersection (the bolded portion of the dashed line) is present, in accordance with some examples.
Figure 9B:
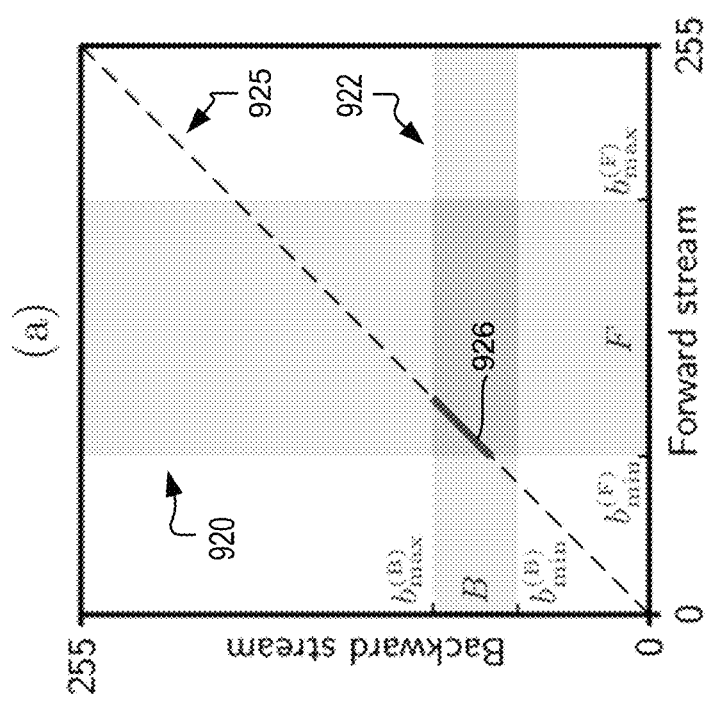
FIG. 9B is a diagram illustrating an example of a range of valid arithmetic coding termination byte values (gray regions) and equal values (dashed line), where an empty intersection is present, in accordance with some examples.

However, as described above with respect to equations (5)-(10) and FIG. 6, the termination byte can be freely chosen according to equation (8). For unidirectional byte packing, there may be no advantage to choosing a specific value. With bidirectional byte packing, the systems and techniques described herein can exploit the freedom of choosing the termination byte by choosing values that can reduce the average overhead. FIG. 9A and FIG. 9B provide two examples illustrating such a concept.

In FIG. 9A, the gray areas represent two sets or ranges F and B (the gray area 920 represents set F and the gray area 922 represents set B) with ranges of termination byte values allowed for correct decoding, for the forward and backward streams, as defined in eq. (8) (which defines a range relative to $b_{min}$ and $b_{max}$). The sets F and B can be defined as follows:

$$F = \{b_{min}^{(F)}, b_{min}^{(F)} + 1, b_{min}^{(F)} + 2, \ldots, b_{max}^{(F)} - 1, b_{max}^{(F)}\}$$
$$B = \{b_{min}^{(B)}, b_{min}^{(B)} + 1, b_{min}^{(B)} + 2, \ldots, b_{max}^{(B)} - 1, b_{max}^{(B)}\} \quad (16)$$

The dashed line 925 in FIG. 9A and FIG. 9B represents the use of the same termination byte value in both the forward stream (represented on the x-axis of FIG. 9A and FIG. 9B) and the backward stream (represented on the y-. In the example of FIG. 9A, there is an intersection between the sets F and B (the intersection of the sets F and B is not empty), and all byte values in that intersecting set (shown as a bolded solid segment 926 along the dashed line) can be used for a shared termination byte. In the example of FIG. 9B, the intersection between the sets F and B is empty (because the dashed line 925 does not pass through both sets F and B at the same time), meaning that a shared termination byte cannot be shared.

The computation of range intersections can be determined as follows:

$$F \cap B = \{b : \max(b_{min}^{(F)}, b_{min}^{(B)}) \leq b \leq \min(b_{max}^{(F)}, b_{max}^{(B)})\}, \quad (17)$$

where ∩ denotes an intersection operation. FIG. 10A and FIG. 10B are diagrams illustrating a termination byte selection process based on the concept illustrated in FIG. 9A and FIG. 9B. FIG. 10A illustrates an example where no intersection exists between the sets F and B. In FIG. 10B, an encoder can determine that a shared termination byte 1016 can be used based on a determination that an intersection exists between bit values of a first termination byte 1012 of a first parcel (the forward stream of FIG. 10B) and a second termination byte 1014 of a second parcel (the backward stream of FIG. 10B). For example, values for the shared termination byte 1016 can be computed by determining the intersection of values between values of the first termination byte 1012 and values of the second termination byte 1014. The shared termination byte 1016 is represented as Byte c in FIG. 10B and includes all values within the sets or ranges F' and B' that intersect (represented by the segment 926 in FIG. 9A), denoted as follows in FIG. 10B:

Byte $c \in F' \cap B'$.

The values that can be included in the shared termination byte 1016 thus include the intersecting values from the first termination byte 1012 and the a second termination byte 1014.

By maximizing the use of shared termination bytes (e.g., using the techniques described with respect to FIG. 8A-FIG. 10B), the systems and techniques described herein can reduce the overhead of the bitstream and compression losses. For example, the encoded bitstream will include less bytes, resulting in reduced overhead in the bitstream. Such a solution can result in large overhead reduction in parallel entropy coding, where many forward and backward streams are included in a bitstream (e.g., such as that shown in FIG.

5, including bidirectional byte array 512, bidirectional byte array 514, through bidirectional byte array 516).

Figure 11A:
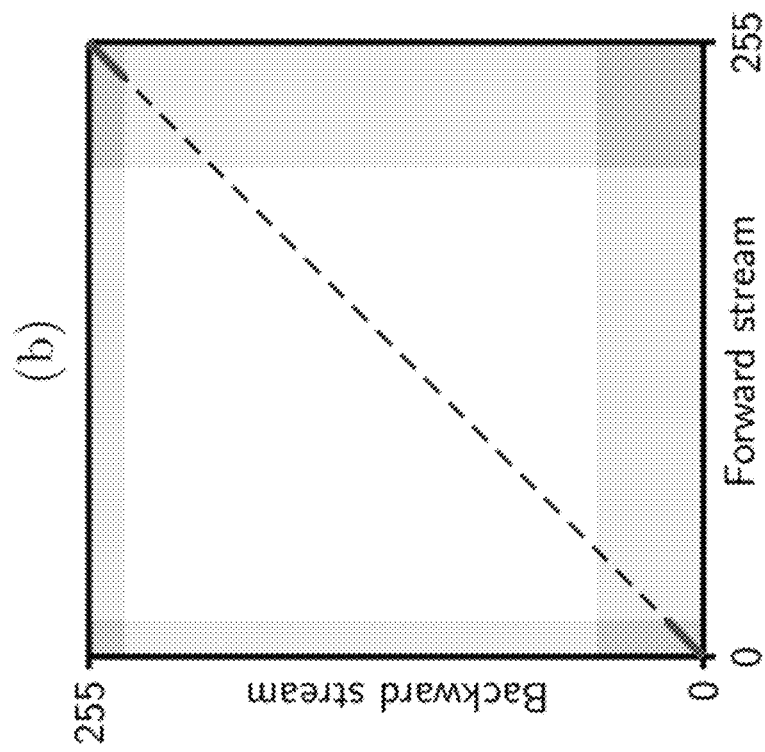
FIG. 11A and FIG. 11B are diagrams illustrating examples of how range intervals for termination bytes can be split when there is the possibility of an arithmetic encoding carry operation in its addition, in accordance with some examples.
Figure 11B:
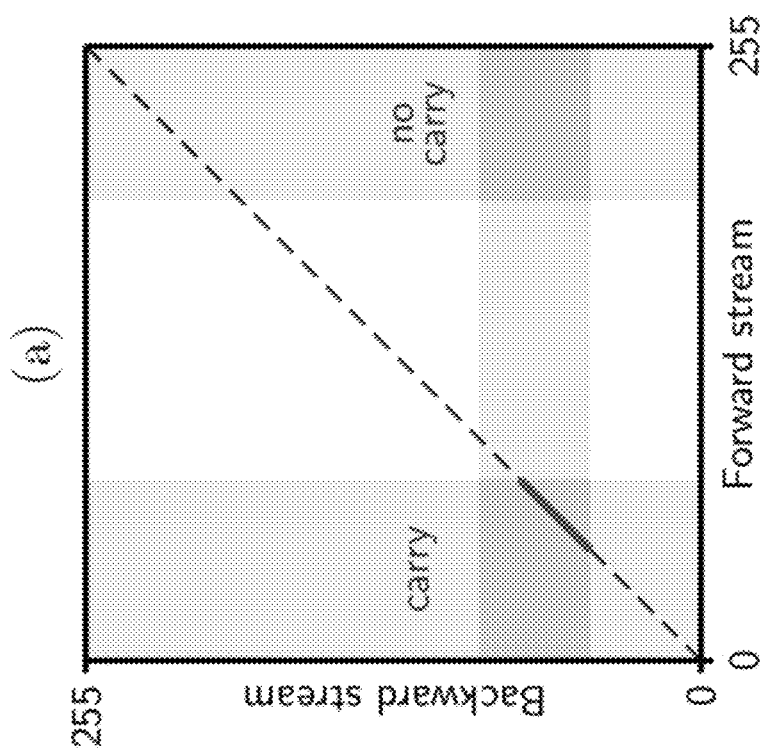

It is noted that, in the examples illustrated in FIG. FIG. 7A, FIG. 7B, FIG. 8A, and FIG. 8B, the only considered factors were bit values. With the examples of FIG. 10A and FIG. 10B with respect to arithmetic coding, there is the more general concept of sets of valid termination bytes. For example, as shown in FIG. 10A and FIG. 10B, there is the notation $a \in F'$, $b \in B'$ because the ranges defined in equation (16) can have $b_{max}^{(F)}$ and $b_{max}^{(B)}$ larger than 256. This happens because of the carry that can occur in the arithmetic coding additions, including during termination. Thus, those sets are defined as:

$$F' = \{b \bmod 256 : b \in F\}$$
$$B' = \{b \bmod 256 : b \in B\} \quad (18)$$

and during termination it may be necessary to identify the termination byte values that correspond to a carry. FIG. 11A and FIG. 11B show examples where such cases occur. It can be observed in FIG. 11A and FIG. 11B that the determination of the intersection is slightly more complicated (e.g., as compared to the illustrations of FIG. 9A and FIG. 9B), because it needs to take into account four possible conditions (i.e., carry or not, for the forward and backward streams, meaning that equation (17) has to be modified to each specific case.

According to simulation results, such carry cases may need to be considered, for each stream, in only 24.6% of the terminations, and the carry occurs in 5.5% of the terminations.

In some cases, the systems and techniques described herein can apply to joint arithmetic coding termination (with a different bit order). For example, if the bytes generated by arithmetic coding in the backward stream are converted to a reverse bit order using a function R(n), then the sets of valid termination bytes shown in FIG. 10A and FIG. 10B are defined by:

$$F' = \{b \bmod 256 : b \in F\}$$
$$B' = \{R(b \bmod 256) : b \in B\} \quad (19)$$

Figure 12A:
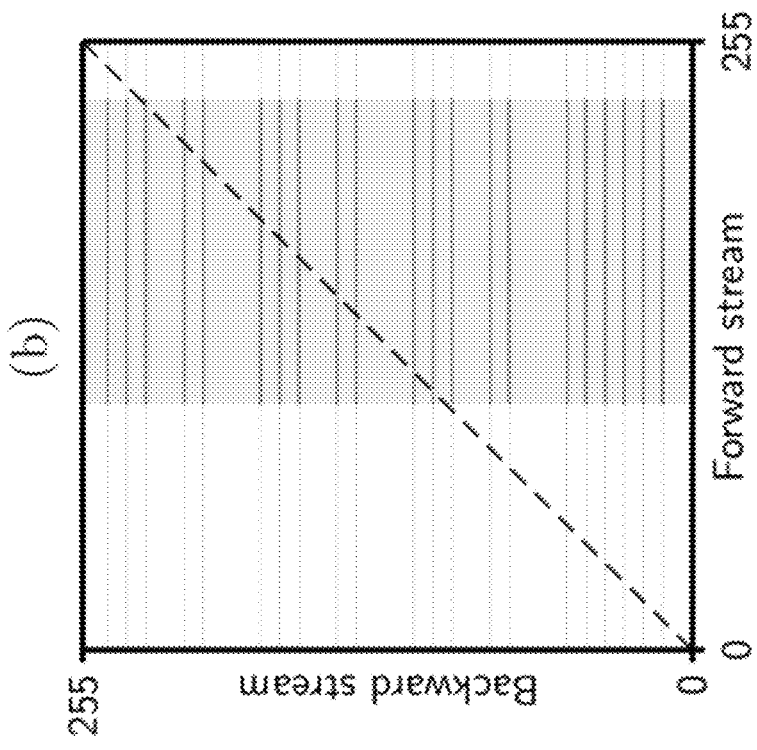
FIG. 12A and FIG. 12B are diagrams illustrating an example similar to that of FIG. 9A and FIG. 9B, but with bits in the backward stream saved in reverse order, in accordance with some examples.
Figure 12B:
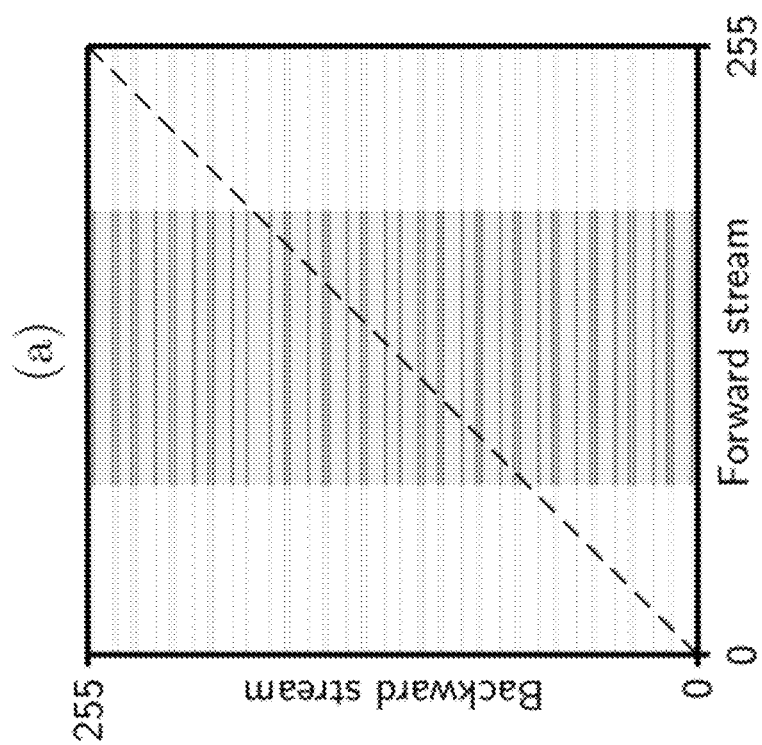

FIG. 12A and FIG. 12B show the new sets based on the reverse bit order, using the same termination ranges as those of the examples in FIG. 9A and FIG. 9B. It can be observed that, in practice, the reversal of the bits in bytes of the backward stream "spreads" the values of valid termination bytes in the interval [0, 255], increasing the occurrence of valid intersections. This is confirmed in the simulation results described below. In some cases, the same results can be obtained when function R(n) is a randomly generated permutation of byte values.

In some examples, the systems and techniques described herein for determining shared (or joint) termination bytes can be used to encode syntax elements for video coding (e.g., syntax elements in an encoded video bitstream), using traditional Standards-based coding and/or using machine learning-based coding. For instance, a joint termination byte can be determined for signaling bits of syntax elements in a bitstream.

Simulation results are now discussed. The bidirectional byte packing and the termination techniques described herein were tested in an implementation of arithmetic coding with 32-bit precision, using random data from an alphabet of 23 symbols, and entropy equal to 2.61 bits/symbol. The averages were measured after coding $2^{25}$ (33 million) parcels.

Table I below shows the simulation results. It can be observe from the results that using the systems and techniques described herein to perform joint termination of arithmetic coding (AC) in the forward and backward bitstreams significantly increases the ratio of termination bytes that can be shared, and consequently reduces the average overhead per parcel.

TABLE I

Average ratio of termination bytes shared, and average termination overhead, measured from simulations.

| Byte packing | Coding method | Backward stream bit order | Ratio of shared term. bytes | Average overhead (bits/parcel) |
|---|---|---|---|---|
| Unidir. | Arithmetic | NA | NA | 4.56 |
| Bidir. | Arithmetic + independent termination | Forward | 20.3% | 3.74 |
| Bidir. | Arithmetic + independent termination | Backward | 43.8% | 2.81 |
| Bidir. | Arithmetic + joint termination | Forward | 44.7% | 2.77 |
| Bidir. | Arithmetic + joint termination | Backward | 69.4% | 1.78 |

Table II below shows the overall advantages of bidirectional byte packing, joint termination, and the efficient NBC method (described with respect to equations (1)-(4)) to code the parcel index. The relative overhead is the average number of overhead bits divided by the number of data bits in a parcel.

TABLE II

Average parcel overhead of parcel index coding plus parcel termination, using the index coding methods described in ref. [5], and the termination overhead results from Table I.

| Avrg. num. parcel bytes | Unidirectional AC + exp-Golomb | | Bidirectional AC + NBC (forward bits in backward stream) | | Bidirectional AC + NBC (reversed bits in backward stream) | |
|---|---|---|---|---|---|---|
| | Overhead (bits/parcel) | Relative overhead | Overhead (bits/parcel) | Relative overhead | Overhead (bits/parcel) | Relative overhead |
| 17.0 | 12.85 | 9.46% | 6.35 | 4.67% | 5.36 | 3.94% |
| 24.0 | 13.77 | 7.16% | 6.61 | 3.44% | 5.62 | 2.92% |
| 34.0 | 14.72 | 5.41% | 6.85 | 2.52% | 5.86 | 2.15% |
| 48.0 | 15.67 | 4.08% | 7.11 | 1.85% | 6.12 | 1.59% |
| 68.0 | 16.65 | 3.06% | 7.34 | 1.35% | 6.35 | 1.17% |
| 96.1 | 17.63 | 2.29% | 7.61 | 0.99% | 6.62 | 0.86% |
| 135.9 | 18.61 | 1.71% | 7.84 | 0.72% | 6.85 | 0.63% |
| 192.2 | 19.60 | 1.27% | 8.11 | 0.53% | 7.12 | 0.46% |
| 271.9 | 20.59 | 0.95% | 8.34 | 0.38% | 7.35 | 0.34% |
| 384.5 | 21.59 | 0.70% | 8.60 | 0.28% | 7.61 | 0.25% |
| 543.7 | 22.59 | 0.52% | 8.84 | 0.20% | 7.85 | 0.18% |
| 768.8 | 23.58 | 0.38% | 9.10 | 0.15% | 8.11 | 0.13% |
| 1087.0 | 24.58 | 0.28% | 9.34 | 0.11% | 8.35 | 0.10% |
| 1537.8 | 25.58 | 0.21% | 9.61 | 0.08% | 8.62 | 0.07% |
| 2174.8 | 26.58 | 0.15% | 9.84 | 0.06% | 8.85 | 0.05% |
| 3076.1 | 27.58 | 0.11% | 10.10 | 0.04% | 9.11 | 0.04% |
| 4349.2 | 28.58 | 0.08% | 10.34 | 0.03% | 9.35 | 0.03% |
| 6151.5 | 29.58 | 0.06% | 10.60 | 0.02% | 9.61 | 0.02% |
| 8699.1 | 30.58 | 0.04% | 10.34 | 0.01% | 9.85 | 0.01% |

It can be observed from the simulation results in Tables I and II that, in the conventional approach of using unidirectional byte packing together with a universal code (e.g., exp-Golomb), the number of bits defining the overhead of parcel index coding plus parcel termination is quite large for small parcel sizes, and grows with twice the logarithm of the average number of bytes per parcel.

In comparison, using the systems and techniques described herein, the overhead for parcels with small number of bytes is reduced by a significant ratio, and the number of overhead bits grows with half the logarithm of the average number of bytes per parcel. In practical terms, the above simulation results show that, using the systems and techniques described herein, the range of parallelization can extended to be employed for entropy coding, reducing the costs for achieving high data throughputs, without compromising compression efficiency.

Figure 13:
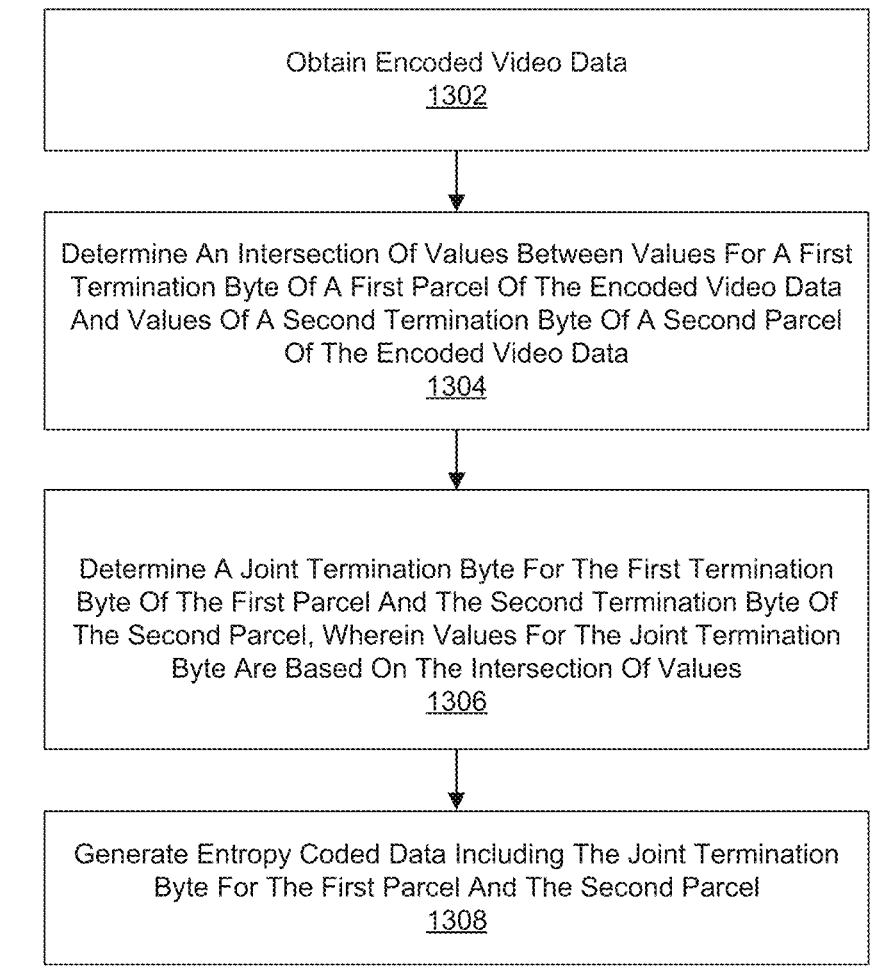
FIG. 13 is a flowchart illustrating an example of a process for processing video data, in accordance with some examples.

FIG. 13 is a flowchart illustrating an example of a process 1300 of processing video using the joint termination techniques described herein. At block 1302, the process 1300 includes obtaining encoded video data. In some cases, the encoded video data can include video data that has been encoded according to a particular video coding Standard (e.g., HEVC, VVC, AVC, EVC, etc.), using a machine learning based video coding system (e.g., where video frames are coded using one or more neural networks), and/or other video coding technique. When obtained at block 1302, the encoded video data is not entropy coded. At block 1304, the process 1300 includes determining an intersection of values between values for a first termination byte of a first parcel of the encoded video data and values of a second termination byte of a second parcel of the encoded video data. Referring to FIG. 9A as an illustrative example, the bolded solid segment 926 along the dashed line indicates an intersection of values between a termination byte of a backward stream and a termination byte of a forward stream.

At block 1306, the process 1300 includes determining a joint (or shared) termination byte for the first termination byte of the first parcel and the second termination byte of the second parcel, wherein values for the joint termination byte are based on the intersection of values. The joint termination byte can be a final termination byte of the first parcel and the second parcel for processing. For instance, referring to FIG. 10B as an illustrative example, the shared (or joint) termination byte 1016 is the final termination byte of the forward stream and the backward stream.

At block 1308, the process 1300 includes generating entropy coded data including the joint termination byte for the first parcel and the second parcel. In some examples, the entropy coded data is generated using arithmetic coding. For example, in some cases, the values for the first termination byte include a first range of termination byte values allowed for decoding, and the values for the second termination byte include a second range of termination byte values allowed for decoding. In such cases, the intersection of values determined at block 1304 includes values that are in the first range and the second range. For instance, referring to FIG. 10B as an illustrative example, the intersection can be determined as intersection between the range F' and the range or set B', in which case the joint termination byte can be determined as Byte c∈F'∩B', as noted above.

In some examples, the entropy coded data is generated using binary coding. In some cases, the values for the first termination byte include a first number of bits, and the values for the second termination byte include a second number of bits. In such cases, the intersection of values determined at block 1304 includes common values that are in the first number of bits and the second number of bits and at least one of a subset of values from the first number of bits and a subset of values from the second number of bits. In some examples, an order of the first number of bits and an order of the second number of bits is unchanged in the joint termination byte as compared to an order of the first number of bits in the first termination byte and an order of the second number of bits in the second termination byte. For instance, referring to FIG. 8B as an illustrative example, the values "100" are common to both the first termination byte 812 and the second termination byte 814. The common bits "100" are included in a first group of bits 818 (with values "100") of a joint or shared termination byte 816. A next group of bits 820 of the shared termination byte 816 (with values "1011") includes the bits from the second termination byte 814 that are unique (not common) with respect to the first termination byte 812. The final bit of the shared termination byte 816 is a "do not care" bit (represented by an "x"). As shown, the orders of the bits in termination byte 812 ("100") from the forward stream and the bits in the termination byte 814 ("1001011") from the backward stream are unchanged in the shared termination byte 816.

In some examples, the process 1300 can generate the entropy coded data by performing parallel entropy encoding of the first parcel and the second parcel. For instance, the first parcel can be encoded using a first encoder, and the second parcel can be encoded using a second encoder. Referring to FIG. 5 as an illustrative example, the first parcel can be encoded by the encoder 502 (e.g., to generate a parcel $l_1$ of entropy coded data) and the second parcel can be encoded by the encoder 504 (e.g., to generate a parcel $l_2$ of entropy coded data).

In some examples, the process 1300 includes storing the first parcel in a first buffer and storing the second parcel in a second buffer. Referring to FIG. 5 as an illustrative example, a first parcel of entropy coded data (e.g., parcels $l_1$ encoded by encoder 502) can be stored in the buffer 506.

In some examples, the process 1300 can include transmitting a bitstream including the entropy coded data (e.g., using a transmitter of the encoding device 204 of FIG. 2). In some examples, the process 1300 can include storing a bitstream including the entropy coded data (e.g., stored in the storage 208 of the encoding device 204 of FIG. 2).

In some examples, the process 1300 can include performing parallel entropy decoding of the first parcel and the second parcel using the joint termination byte for the first parcel and the second parcel. The parallel entropy decoding can be performed using the techniques described above. For example, the process 1300 can include reading the first parcel in a forward order and reading the second parcel in a backward order. In some cases, the process 1300 can include converting bytes of the second parcel to a reverse order. In some cases, once the data is entropy decoded, other decoding operations can be performed (e.g., by performing intra-prediction, inter-prediction, etc.).

In some cases, the encoded video data comprises one or more syntax elements of a video bitstream. In some aspects, the one or more syntax elements are indicative of one or more parameters defining a neural network for decoding the encoded video data. For instance, the one or more parameters defining the neural network can include weights of the neural network (e.g., trained using backpropagation, as described below), one or more activation functions of the neural network, and/or other parameters of the neural network.

FIG. 14 is a flowchart illustrating another example of a process 1400 of processing video using the joint termination techniques described herein. At block 1402, the process 1400 includes obtaining a first parcel of entropy coded data and a second parcel of entropy coded data. In some examples, the process 1400 includes obtaining the first parcel from a first buffer and obtaining the second parcel from a second buffer. Referring to FIG. 5 as an illustrative example, a first parcel of entropy coded data (e.g., parcels $l_1$ encoded by encoder 502) can be obtained from the buffer 506. In some examples, the entropy coded data includes video data. In some examples, the entropy coded data includes image data.

The first parcel and the second parcel share a joint (or shared) termination byte. Values for the joint termination byte are based on an intersection of values between values for a first termination byte of the first parcel and values of a second termination byte of the second parcel. Referring to FIG. 9A as an illustrative example, the bolded solid segment 926 along the dashed line indicates an intersection of values between a termination byte of a backward stream and a termination byte of a forward stream.

In some cases, the process 1400 includes receiving an encoded video bitstream that includes the first parcel and the second parcel. In some examples, the encoded video bitstream includes one or more syntax elements. In some aspects, the one or more syntax elements are indicative of one or more parameters defining a neural network for decoding the encoded video data. For instance, the one or more parameters defining the neural network can include weights of the neural network (e.g., trained using backpropagation, as described below), one or more activation functions of the neural network, and/or other parameters of the neural network.

In some examples, the entropy coded data can be generated using arithmetic coding. For instance, in some cases, the values for the first termination byte include a first range of termination byte values allowed for decoding, and the values for the second termination byte include a second range of termination byte values allowed for decoding. In such cases, the intersection of values includes values that are in the first range and the second range. For instance, referring to FIG. 10B as an illustrative example, the intersection can be determined as intersection between the range F' and the range or set B', in which case the joint termination byte can be determined as Byte c E F' n B', as noted above.

In some examples, the entropy coded data can be generated using binary coding. In some cases, the values for the first termination byte include a first number of bits, and the values for the second termination byte include a second number of bits. In such cases, the intersection of values includes common values that are in the first number of bits and the second number of bits and at least one of a subset of values from the first number of bits and a subset of values from the second number of bits. In some examples, an order of the first number of bits and an order of the second number of bits is unchanged in the joint termination byte as compared to an order of the first number of bits in the first termination byte and an order of the second number of bits in the second termination byte. For instance, referring to FIG. 8B as an illustrative example, the values "100" are common to both the first termination byte 812 and the second termination byte 814, and are included in a first group of bits 818 (with values "100") of a joint or shared termination byte 816. A next group of bits 820 of the shared termination byte 816 (with values "1011") includes the bits from the second termination byte 814 that are unique (not common) with respect to the first termination byte 812. The final bit of the shared termination byte 816 is a "do not care" bit (represented by an "x"). As shown, the orders of the bits in termination byte 812 ("100") from the forward stream and the bits in the termination byte 814 ("1001011") from the backward stream are unchanged in the shared termination byte 816.

In some examples, the first parcel of entropy coded data can be decoded using a first decoder, and the second parcel of entropy coded data can be decoded using a second decoder. Referring to FIG. 5 as an illustrative example, the first parcel can be decoded by the decoder 518 and the second parcel can be encoded by the decoder 520.

At block 1404, the process 1400 includes performing parallel entropy decoding of the first parcel and the second parcel using the joint termination byte for the first parcel and the second parcel. The parallel entropy decoding can be performed using the techniques described herein. For example, the process 1400 can include reading the first parcel in a forward order and reading the second parcel in a backward order. In some cases, the process 1400 can include converting bytes of the second parcel to a reverse order. Once the data is entropy decoded, other decoding operations can be performed (e.g., by performing intra-prediction, inter-prediction, etc.).

Figure 17:
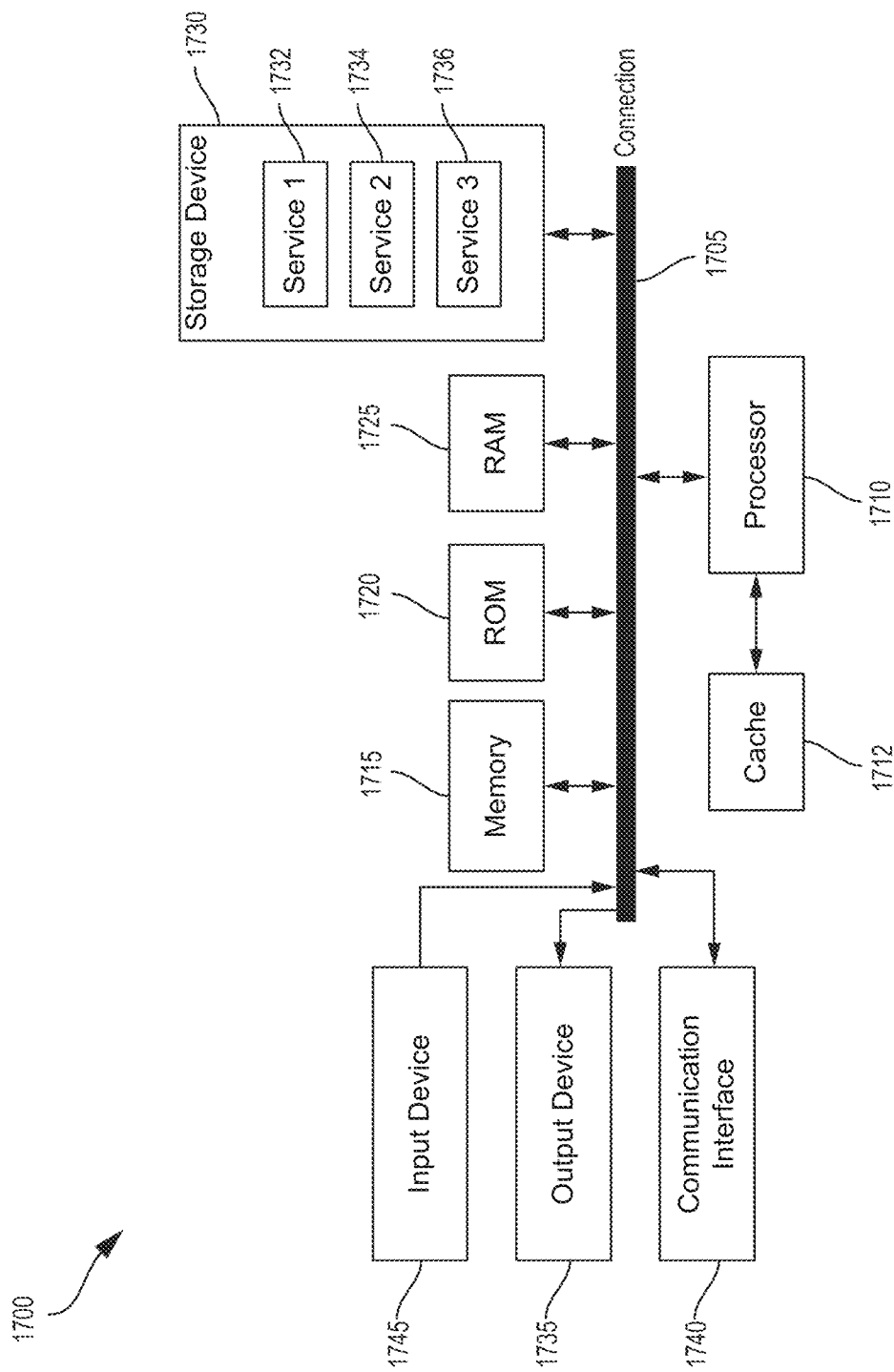
FIG. 17 illustrates an example computing device architecture of an example computing device which can implement the various techniques described herein.

In some examples, the processes described herein (e.g., process 1300, process 1400, and/or other process described herein) may be performed by a computing device or apparatus, such as a computing device having the computing device architecture 1700 shown in FIG. 17. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 1300 and/or process 1400.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The process 1300 and the process 1400 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1300, process 1400, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted previously, some video coding systems utilize neural networks or other machine learning systems to compress video and/or image data. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 15A:
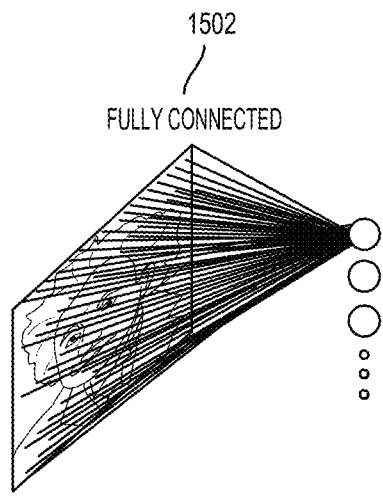
FIG. 15A illustrates an example of a fully connected neural network, in accordance with some examples.
Figure 15B:
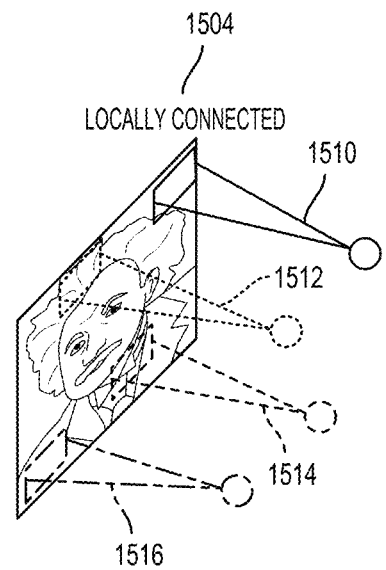
FIG. 15B illustrates an example of a locally connected neural network, in accordance with some examples.

The connections between layers of a neural network may be fully connected or locally connected. FIG. 15A illustrates an example of a fully connected neural network 1502. In a fully connected neural network 1502, a neuron in a first layer may communicate its output to every neuron in a second layer, so that each neuron in the second layer will receive input from every neuron in the first layer. FIG. 15B illustrates an example of a locally connected neural network 1504. In a locally connected neural network 1504, a neuron in a first layer may be connected to a limited number of neurons in the second layer. More generally, a locally connected layer of the locally connected neural network 1504 may be configured so that each neuron in a layer will have the same or a similar connectivity pattern, but with connections strengths that may have different values (e.g., 1510, 1512, 1514, and 1516). The locally connected connectivity pattern may give rise to spatially distinct receptive fields in a higher layer, because the higher layer neurons in a given region may receive inputs that are tuned through training to the properties of a restricted portion of the total input to the network.

Figure 15C:
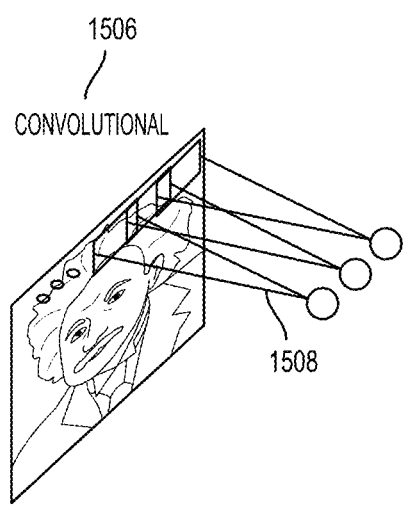
FIG. 15C illustrates an example of a convolutional neural network, in accordance with some examples.

One example of a locally connected neural network is a convolutional neural network. FIG. 15C illustrates an example of a convolutional neural network 1506. The convolutional neural network 1506 may be configured such that the connection strengths associated with the inputs for each neuron in the second layer are shared (e.g., 1508). Convolutional neural networks may be well suited to problems in which the spatial location of inputs is meaningful. Convolutional neural network 1506 may be used to perform one or more aspects of video compression and/or decompression, according to aspects of the present disclosure.

Figure 15D:
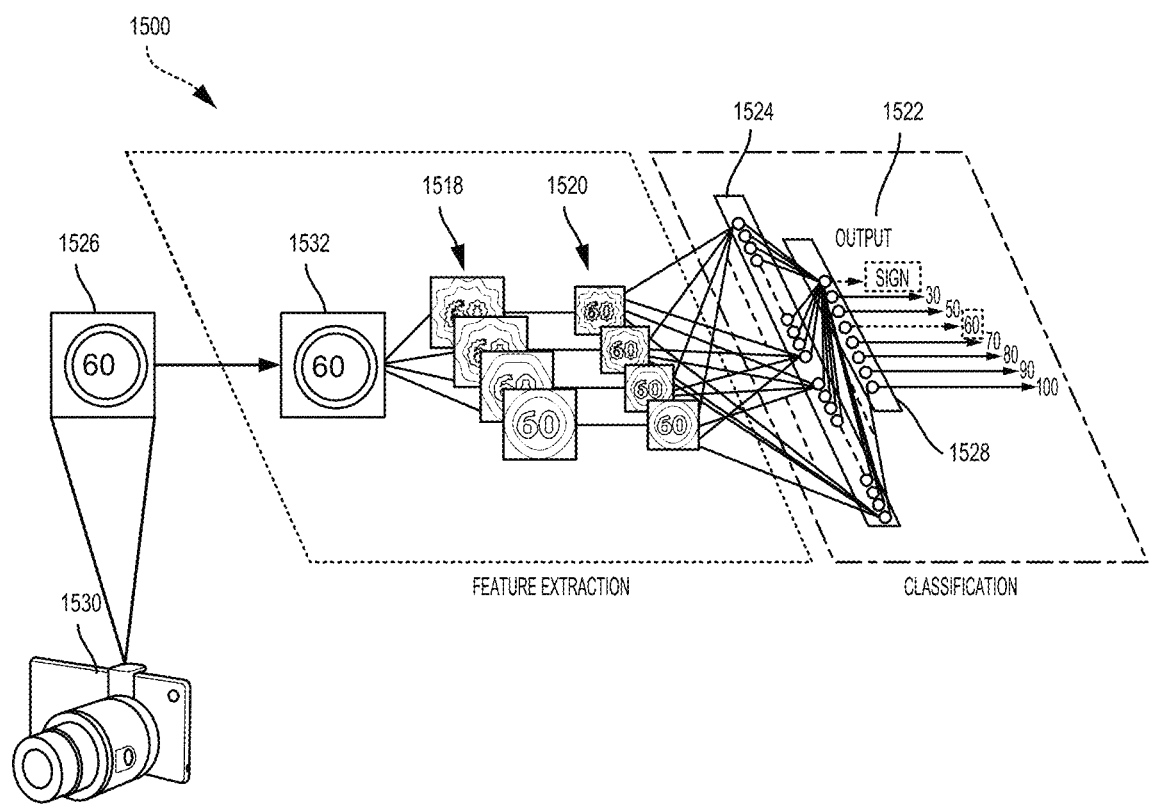
FIG. 15D illustrates a detailed example of a deep convolutional network (DCN) designed to recognize visual features from an image, in accordance with some examples.

One type of convolutional neural network is a deep convolutional network (DCN). FIG. 15D illustrates a detailed example of a DCN 1500 designed to recognize visual features from an image 1526 input from an image capturing device 1530, such as a car-mounted camera. The DCN 1500 of the current example may be trained to identify traffic signs and a number provided on the traffic sign. Of course, the DCN 1500 may be trained for other tasks, such as identifying lane markings or identifying traffic lights.

The DCN 1500 may be trained with supervised learning. During training, the DCN 1500 may be presented with an image, such as the image 1526 of a speed limit sign, and a forward pass may then be computed to produce an output 1522. The DCN 1500 may include a feature extraction section and a classification section. Upon receiving the image 1526, a convolutional layer 1532 may apply convolutional kernels (not shown) to the image 1526 to generate a first set of feature maps 1518. As an example, the convolutional kernel for the convolutional layer 1532 may be a 5×5 kernel that generates 28×28 feature maps. In the present example, because four different feature maps are generated in the first set of feature maps 1518, four different convolutional kernels were applied to the image 1526 at the convolutional layer 1532. The convolutional kernels may also be referred to as filters or convolutional filters.

The first set of feature maps 1518 may be subsampled by a max pooling layer (not shown) to generate a second set of feature maps 1520. The max pooling layer reduces the size of the first set of feature maps 1518. That is, a size of the second set of feature maps 1520, such as 14×14, is less than the size of the first set of feature maps 1518, such as 28×28. The reduced size provides similar information to a subsequent layer while reducing memory consumption. The second set of feature maps 1520 may be further convolved via one or more subsequent convolutional layers (not shown) to generate one or more subsequent sets of feature maps (not shown).

In the example of FIG. 15D, the second set of feature maps 1520 is convolved to generate a first feature vector 1524. Furthermore, the first feature vector 1524 is further convolved to generate a second feature vector 1528. Each feature of the second feature vector 1528 may include a number that corresponds to a possible feature of the image 1526, such as "sign," "60," and "100." A softmax function (not shown) may convert the numbers in the second feature vector 1528 to a probability. As such, an output 1522 of the DCN 1500 is a probability of the image 1526 including one or more features.

In the present example, the probabilities in the output 1522 for "sign" and "60" are higher than the probabilities of the others of the output 1522, such as "30," "40," "50," "70," "80," "90," and "100". Before training, the output 1522 produced by the DCN 1500 is likely to be incorrect. Thus, an error may be calculated between the output 1522 and a target output. The target output is the ground truth of the image 1526 (e.g., "sign" and "60"). The weights of the DCN 1500 may then be adjusted so the output 1522 of the DCN 1500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 1522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 1520) receiving input from a range of neurons in the previous layer (e.g., feature maps 1518) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 16:
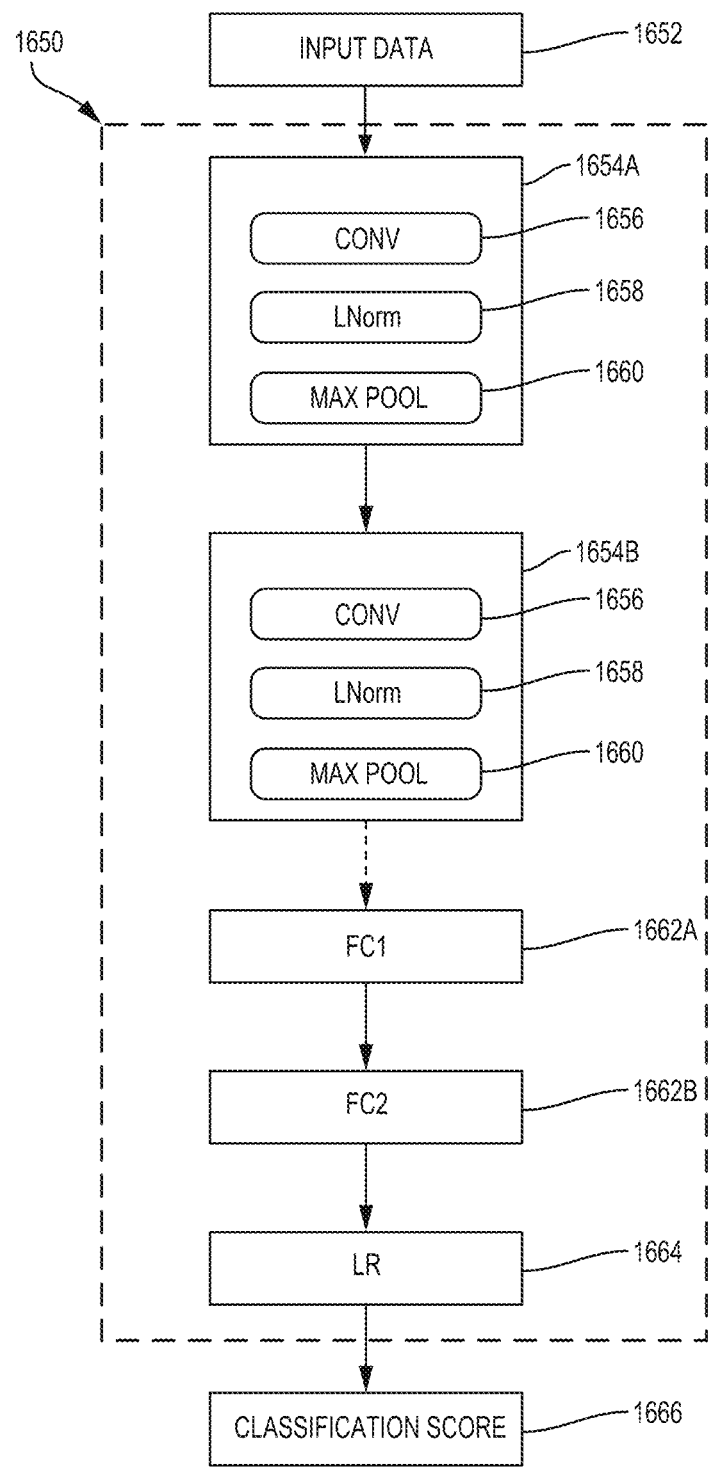
FIG. 16 is a block diagram illustrating a deep convolutional network (DCN), in accordance with some examples.

FIG. 16 is a block diagram illustrating an example of a deep convolutional network 1650. The deep convolutional network 1650 may include multiple different types of layers based on connectivity and weight sharing. As shown in FIG. 16, the deep convolutional network 1650 includes the convolution blocks 1654A, 1654B. Each of the convolution blocks 1654A, 1654B may be configured with a convolution layer (CONV) 1656, a normalization layer (LNorm) 1658, and a max pooling layer (MAX POOL) 1660.

The convolution layers 1656 may include one or more convolutional filters, which may be applied to the input data 1652 to generate a feature map. Although only two convolution blocks 1654A, 1654B are shown, the present disclosure is not so limiting, and instead, any number of convolution blocks (e.g., blocks 1654A, 1654B) may be included in the deep convolutional network 1650 according to design preference. The normalization layer 1658 may normalize the output of the convolution filters. For example, the normalization layer 1658 may provide whitening or lateral inhibition. The max pooling layer 1660 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 1650 may access other processing blocks that may be present on the SOC 100, such as sensor processor 114 and navigation module 120, dedicated, respectively, to sensors and navigation.

The deep convolutional network 1650 may also include one or more fully connected layers, such as layer 1662A (labeled "FC1") and layer 1662B (labeled "FC2"). The deep convolutional network 1650 may further include a logistic regression (LR) layer 1664. Between each layer 1656, 1658, 1660, 1662A, 1662B, 1664 of the deep convolutional network 1650 are weights (not shown) that are to be updated. The output of each of the layers (e.g., 1656, 1658, 1660, 1662A, 1662B, 1664) may serve as an input of a succeeding one of the layers (e.g., 1656, 1658, 1660, 1662A, 1662B, 1664) in the deep convolutional network 1650 to learn hierarchical feature representations from input data 1652 (e.g., images, audio, video, sensor data and/or other input data) supplied at the first of the convolution blocks 1654A. The output of the deep convolutional network 1650 is a classification score 1666 for the input data 1652. The classification score 1666 may be a set of probabilities, where each probability is the probability of the input data including a feature from a set of features.

FIG. 17 illustrates an example computing device architecture 1700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1700 can be used as part of the system 200 of FIG. 2 and/or the system 300 of FIG. 3. The components of computing device architecture 1700 are shown in electrical communication with each other using connection 1705, such as a bus. The example computing device architecture 1700 includes a processing unit (CPU or processor) 1710 and computing device connection 1705 that couples various computing device components including computing device memory 1715, such as read only memory (ROM) 1720 and random access memory (RAM) 1725, to processor 1710.

Computing device architecture 1700 can include a cache of high-speed memory connected directly with, in close proximity to, or integrated as part of processor 1710. Computing device architecture 1700 can copy data from memory 1715 and/or the storage device 1730 to cache 1712 for quick access by processor 1710. In this way, the cache can provide a performance boost that avoids processor 1710 delays while waiting for data. These and other modules can control or be configured to control processor 1710 to perform various actions. Other computing device memory 1715 may be available for use as well. Memory 1715 can include multiple different types of memory with different performance characteristics. Processor 1710 can include any general purpose processor and a hardware or software service, such as service 1 1732, service 2 1734, and service 3 1736 stored in storage device 1730, configured to control processor 1710 as well as a special-purpose processor where software instructions are incorporated into the processor design. Processor 1710 may be a self-contained system, containing multiple cores or processors, a bus, memory controller, cache, etc. A multi-core processor may be symmetric or asymmetric.

To enable user interaction with the computing device architecture 1700, input device 1745 can represent any number of input mechanisms, such as a microphone for speech, a touch-sensitive screen for gesture or graphical input, keyboard, mouse, motion input, speech and so forth. Output device 1735 can also be one or more of a number of output mechanisms known to those of skill in the art, such as a display, projector, television, speaker device, etc. In some instances, multimodal computing devices can enable a user to provide multiple types of input to communicate with computing device architecture 1700. Communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof. Storage device 1730 can include services 1732, 1734, 1736 for controlling processor 1710. Other hardware or software modules are contemplated. Storage device 1730 can be connected to the computing device connection 1705. In one aspect, a hardware module that performs a particular function can include the software component stored in a computer-readable medium in connection with the necessary hardware components, such as processor 1710, connection 1705, output device 1735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing video data. The method comprises: obtaining encoded video data; determining an intersection of values between values for a first termination byte of a first parcel of the encoded video data and values of a second termination byte of a second parcel of the encoded video data; determining a joint termination byte for the first termination byte of the first parcel and the second termination byte of the second parcel, wherein values for the joint termination byte are based on the intersection of values; and generating entropy coded data including the joint termination byte for the first parcel and the second parcel.

Aspect 2: The method of aspect 1, further comprising: generating the entropy coded data using arithmetic coding.

Aspect 3: The method of any one of aspects 1 or 2, wherein the values for the first termination byte include a first range of termination byte values allowed for decoding, wherein the values for the second termination byte include a second range of termination byte values allowed for decoding, and wherein the intersection of values includes values that are in the first range and the second range.

Aspect 4: The method of aspect 1, wherein the entropy coded data is generated using binary coding.

Aspect 5: The method of any one of aspects aspect 1 or 4, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

Aspect 6: The method of aspect 5, wherein an order of the first number of bits and an order of the second number of bits is unchanged in the joint termination byte as compared to an order of the first number of bits in the first termination byte and an order of the second number of bits in the second termination byte.

Aspect 7: The method of any one of aspects 1 to 6, wherein generating the entropy coded data includes performing parallel entropy encoding of the first parcel and the second parcel.

Aspect 8: The method of any one of aspects 1 to 7, wherein the first parcel is encoded using a first encoder, and wherein the second parcel is encoded using a second encoder.

Aspect 9: The method of any one of aspects 1 to 8, further comprising: storing the first parcel in a first buffer; and storing the second parcel in a second buffer.

Aspect 10: The method of any one of aspects 1 to 9, further comprising: transmitting a bitstream including the entropy coded data.

Aspect 11: The method of any one of aspects 1 to 10, further comprising: storing a bitstream including the entropy coded data.

Aspect 12: The method of any one of aspects 1 to 11, further comprising: performing parallel entropy decoding of the first parcel and the second parcel using the joint termination byte for the first parcel and the second parcel.

Aspect 13: The method of any one of aspects 1 to 12, further comprising: reading the first parcel in a forward order; and reading the second parcel in a backward order.

Aspect 14: The method of any one of aspects 1 to 13, further comprising: converting bytes of the second parcel to a reverse order.

Aspect 15: The method of any one of aspects 1 to 14, wherein the joint termination byte is a final termination byte of the first parcel and the second parcel for processing.

Aspect 16: The method of any one of aspects 1 to 15, wherein the encoded video data comprises one or more syntax elements of a video bitstream.

Aspect 17: The method of aspect 16, wherein the one or more syntax elements are indicative of one or more parameters defining a neural network for decoding the encoded video data.

Aspect 18: The method of aspect 17, wherein the one or more parameters defining the neural network comprise at least one of weights of the neural network and an activation function of the neural network.

Aspect 19: An apparatus for processing video data. The apparatus includes a memory configured to store video data and a processor or multiple processors (e.g., implemented in circuitry) coupled to the memory. The one or more processors are configured to: obtain encoded video data; determine an intersection of values between values for a first termination byte of a first parcel of the encoded video data and values of a second termination byte of a second parcel of the encoded video data; determine a joint termination byte for the first termination byte of the first parcel and the second termination byte of the second parcel, wherein values for the joint termination byte are based on the intersection of values; and generate entropy coded data including the joint termination byte for the first parcel and the second parcel.

Aspect 20: The apparatus of aspect 19, wherein the one or more processors are configured to use arithmetic coding to generate the entropy coded data.

Aspect 21: The apparatus of any one of aspects 19 or 20, wherein the values for the first termination byte include a first range of termination byte values allowed for decoding, wherein the values for the second termination byte include a second range of termination byte values allowed for decoding, and wherein the intersection of values includes values that are in the first range and the second range.

Aspect 22: The apparatus of aspect 19, wherein the one or more processors are configured to use binary coding to generate the entropy coded data.

Aspect 23: The apparatus of any one of aspects 19 or 22, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

Aspect 24: The apparatus of aspect 23, wherein an order of the first number of bits and an order of the second number of bits is unchanged in the joint termination byte as compared to an order of the first number of bits in the first termination byte and an order of the second number of bits in the second termination byte.

Aspect 25: The apparatus of any one of aspects 19 to 24, wherein, to generate the entropy coded data, the one or more processors are configured to perform parallel entropy encoding of the first parcel and the second parcel.

Aspect 26: The apparatus of any one of aspects 19 to 25, further comprising: a first encoder configured to encode the first parcel; and a second encoder configured to encode the second parcel.

Aspect 27: The apparatus of any one of aspects 19 to 26, further comprising: a first buffer configured to store the first parcel from; and a second buffer configured to store the second parcel.

Aspect 28: The apparatus of any one of aspects 19 to 27, wherein the one or more processors are configured to: transmit a bitstream including the entropy coded data.

Aspect 29: The apparatus of any one of aspects 19 to 28, wherein the one or more processors are configured to: store a bitstream including the entropy coded data.

Aspect 30: The apparatus of any one of aspects 19 to 29, wherein the one or more processors are configured to: perform parallel entropy decoding of the first parcel and the second parcel using the joint termination byte for the first parcel and the second parcel.

Aspect 31: The apparatus of any one of aspects 19 to 30, wherein the one or more processors are configured to: read the first parcel in a forward order; and read the second parcel in a backward order.

Aspect 32: The apparatus of any one of aspects 19 to 31, wherein the one or more processors are configured to: convert bytes of the second parcel to a reverse order.

Aspect 33: The apparatus of any one of aspects 19 to 32, wherein the joint termination byte is a final termination byte of the first parcel and the second parcel for processing.

Aspect 34: The apparatus of any one of aspects 19 to 33, wherein the encoded video data comprises one or more syntax elements of a video bitstream.

Aspect 35: The apparatus of aspect 34, wherein the one or more syntax elements are indicative of one or more parameters defining a neural network for decoding the encoded video data.

Aspect 36: The apparatus of aspect 35, wherein the one or more parameters defining the neural network comprise at least one of weights of the neural network and an activation function of the neural network.

Aspect 37: The apparatus of any one of aspects 19 to 36, wherein the processor includes a neural processing unit (NPU).

Aspect 38: The apparatus of any one of aspects 19 to 37, wherein the apparatus is a mobile device.

Aspect 39: The apparatus of any one of aspects 19 to 37, wherein the apparatus is an extended reality device.

Aspect 40: The apparatus of any one of aspects 19 to 37, wherein the apparatus is a television.

Aspect 41: The apparatus of any one of aspects 19 to 40, further comprising a display.

Aspect 42: The apparatus of any one of aspects 19 to 41, wherein the apparatus comprises a camera configured to capture one or more video frames.

Aspect 43: A computer-readable storage medium storing instructions that, when executed, cause one or more processors to perform any of the operations of aspects 1 to 42.

Aspect 44: An apparatus comprising means for performing any of the operations of aspects 1 to 42.

Aspect 45: A method of processing video data, the method comprising: obtaining a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and performing parallel entropy decoding of the first parcel and the second parcel using the joint termination byte for the first parcel and the second parcel.

Aspect 46: The method of aspect 45, wherein the entropy coded data is encoded using arithmetic coding.

Aspect 47: The method of any one of aspects 45 or 46, wherein the values for the first termination byte include a first range of termination byte values allowed for decoding, wherein the values for the second termination byte include a second range of termination byte values allowed for decoding, and wherein the intersection of values includes values that are in the first range and the second range.

Aspect 48: The method of aspect 45, wherein the entropy coded data is generated using binary coding.

Aspect 49: The method of any one of aspects aspect 45 or 48, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

Aspect 50: The method of aspect 49, wherein an order of the first number of bits and an order of the second number of bits is unchanged in the joint termination byte as compared to an order of the first number of bits in the first termination byte and an order of the second number of bits in the second termination byte.

Aspect 51: The method of any one of aspects 45 to 50, further comprising: obtaining the first parcel from a first buffer; and obtaining the second parcel from a second buffer.

Aspect 52: The method of any one of aspects 45 to 51, further comprising: reading the first parcel in a forward order; and reading the second parcel in a backward order.

Aspect 53: The method of any one of aspects 45 to 52, further comprising: converting bytes of the second parcel to a reverse order.

Aspect 54: The method of any one of aspects 45 to 53, wherein the joint termination byte is a final termination byte of the first parcel and the second parcel for processing.

Aspect 55: The method of any one of aspects 45 to 54, further comprising: receiving a video bitstream, the video bitstream including the first parcel, the second parcel, and one or more syntax elements.

Aspect 56: The method of aspect 55, wherein the one or more syntax elements are indicative of one or more parameters defining a neural network for decoding the encoded video data.

Aspect 57: The method of aspect 56, wherein the one or more parameters defining the neural network comprise at least one of weights of the neural network and an activation function of the neural network.

Aspect 58: An apparatus for processing video data. The apparatus includes a memory configured to store video data and a processor or multiple processors (e.g., implemented in circuitry) coupled to the memory. The one or more processors are configured to: obtain a first parcel of entropy coded data and a second parcel of entropy coded data, the first parcel and the second parcel sharing a joint termination byte, wherein values for the joint termination byte are based on an intersection of values between values for a first termination byte of the first parcel and values of a second termination byte of the second parcel; and perform parallel entropy decoding of the first parcel and the second parcel using the joint termination byte for the first parcel and the second parcel.

Aspect 59: The apparatus of aspect 58, wherein the entropy coded data is encoded using arithmetic coding.

Aspect 60: The apparatus of any one of aspects 58 or 59, wherein the values for the first termination byte include a first range of termination byte values allowed for decoding, wherein the values for the second termination byte include a second range of termination byte values allowed for decoding, and wherein the intersection of values includes values that are in the first range and the second range.

Aspect 61: The apparatus of aspect 58, wherein the entropy coded data is generated using binary coding.

Aspect 62: The apparatus of any one of aspects aspect 58 or 61, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

Aspect 63: The apparatus of aspect 62, wherein an order of the first number of bits and an order of the second number of bits is unchanged in the joint termination byte as compared to an order of the first number of bits in the first termination byte and an order of the second number of bits in the second termination byte.

Aspect 64: The apparatus of any one of aspects 58 to 63, wherein the one or more processors are configured to: obtain the first parcel from a first buffer; and obtain the second parcel from a second buffer.

Aspect 65: The apparatus of any one of aspects 58 to 64, wherein the one or more processors are configured to: read the first parcel in a forward order; and read the second parcel in a backward order.

Aspect 66: The apparatus of any one of aspects 58 to 65, wherein the one or more processors are configured to: convert bytes of the second parcel to a reverse order.

Aspect 67: The apparatus of any one of aspects 58 to 66, wherein the joint termination byte is a final termination byte of the first parcel and the second parcel for processing.

Aspect 68: The apparatus of any one of aspects 58 to 67, wherein the one or more processors are configured to: obtain a video bitstream, the video bitstream including the first parcel, the second parcel, and one or more syntax elements.

Aspect 69: The apparatus of aspect 68, wherein the one or more syntax elements are indicative of one or more parameters defining a neural network for decoding the encoded video data.

Aspect 70: The apparatus of aspect 69, wherein the one or more parameters defining the neural network comprise at least one of weights of the neural network and an activation function of the neural network.

Aspect 71: The apparatus of any one of aspects 58 to 70, wherein the processor includes a neural processing unit (NPU).

Aspect 72: The apparatus of any one of aspects 58 to 71, wherein the apparatus is a mobile device.

Aspect 73: The apparatus of any one of aspects 58 to 71, wherein the apparatus is an extended reality device.

Aspect 74: The apparatus of any one of aspects 58 to 71, wherein the apparatus is a television.

Aspect 75: The apparatus of any one of aspects 58 to 74, further comprising a display.

Aspect 76: The apparatus of any one of aspects 58 to 75, wherein the apparatus comprises a camera configured to capture one or more video frames.

Aspect 77: A computer-readable storage medium storing instructions that, when executed, cause one or more processors to perform any of the operations of aspects 58 to 76.

Aspect 78: An apparatus comprising means for performing any of the operations of aspects 58 to 76.

Aspect 79: A method configured to perform any of the operations of aspects 1 to 42 and aspects 58 to 76.

Aspect 80: An apparatus for processing video data. The apparatus includes a memory configured to store video data and a processor or multiple processors (e.g., implemented in circuitry) coupled to the memory. The one or more processors are configured to perform any of the operations of aspects 1 to 42 and aspects 58 to 76.

Aspect 81: A computer-readable storage medium storing instructions that, when executed, cause one or more processors to perform any of the operations of aspects 1 to 42 and aspects 58 to 76.

Aspect 82: An apparatus comprising means for performing any of the operations of aspects 1 to 42 and aspects 58 to 76.

What is claimed is:

1. A method of processing video data, the method comprising:
    obtaining encoded video data;
    determining an intersection of values between values for a first termination byte of a first parcel of the encoded video data and values of a second termination byte of a second parcel of the encoded video data;
    determining a joint termination byte for the first termination byte of the first parcel and the second termination byte of the second parcel, wherein values for the joint termination byte are based on the intersection of values; and
    generating entropy coded data including the joint termination byte for the first parcel and the second parcel.

2. The method of claim 1, wherein the entropy coded data is generated using arithmetic coding.

3. The method of claim 2, wherein the values for the first termination byte include a first range of termination byte values allowed for decoding, wherein the values for the second termination byte include a second range of termination byte values allowed for decoding, and wherein the intersection of values includes values that are in the first range and the second range.

4. The method of claim 1, wherein the entropy coded data is generated using binary coding.

5. The method of claim 4, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

6. The method of claim 5, wherein an order of the first number of bits and an order of the second number of bits is unchanged in the joint termination byte as compared to an order of the first number of bits in the first termination byte and an order of the second number of bits in the second termination byte.

7. The method of claim 1, wherein generating the entropy coded data includes performing parallel entropy encoding of the first parcel and the second parcel.

8. The method of claim 7, wherein the first parcel is encoded using a first encoder, and wherein the second parcel is encoded using a second encoder.

9. The method of claim 1, further comprising:
    performing parallel entropy decoding of the first parcel and the second parcel using the joint termination byte for the first parcel and the second parcel.

10. The method of claim 9, further comprising:
reading the first parcel in a forward order; and
reading the second parcel in a backward order.

11. The method of claim 10, further comprising:
converting bytes of the second parcel to a reverse order.

12. The method of claim 1, wherein the joint termination byte is a final termination byte of the first parcel and the second parcel for processing.

13. The method of claim 1, wherein the encoded video data comprises one or more syntax elements of a video bitstream.

14. The method of claim 13, wherein the one or more syntax elements are indicative of one or more parameters defining a neural network for decoding the encoded video data.

15. The method of claim 14, wherein the one or more parameters defining the neural network comprise at least one of weights of the neural network and an activation function of the neural network.

16. An apparatus for processing video data, comprising:
a memory configured to store video data; and
one or more processors coupled to the memory and configured to:
obtain encoded video data;
determine an intersection of values between values for a first termination byte of a first parcel of the encoded video data and values of a second termination byte of a second parcel of the encoded video data;
determine a joint termination byte for the first termination byte of the first parcel and the second termination byte of the second parcel, wherein values for the joint termination byte are based on the intersection of values; and
generate entropy coded data including the joint termination byte for the first parcel and the second parcel.

17. The apparatus of claim 16, wherein the one or more processors are configured to use arithmetic coding to generate the entropy coded data.

18. The apparatus of claim 17, wherein the values for the first termination byte include a first range of termination byte values allowed for decoding, wherein the values for the second termination byte include a second range of termination byte values allowed for decoding, and wherein the intersection of values includes values that are in the first range and the second range.

19. The apparatus of claim 16, wherein the one or more processors are configured to use binary coding to generate the entropy coded data.

20. The apparatus of claim 19, wherein the values for the first termination byte include a first number of bits, wherein the values for the second termination byte include a second number of bits, and wherein the intersection of values includes common values that are in the first number of bits and the second number of bits and at least one of a subset of values from the first number of bits and a subset of values from the second number of bits.

21. The apparatus of claim 20, wherein an order of the first number of bits and an order of the second number of bits is unchanged in the joint termination byte as compared to an order of the first number of bits in the first termination byte and an order of the second number of bits in the second termination byte.

22. The apparatus of claim 16, wherein, to generate the entropy coded data, the one or more processors are configured to perform parallel entropy encoding of the first parcel and the second parcel.

23. The apparatus of claim 22, further comprising:
a first encoder configured to encode the first parcel; and
a second encoder configured to encode the second parcel.

24. The apparatus of claim 16, wherein the one or more processors are configured to:
perform parallel entropy decoding of the first parcel and the second parcel using the joint termination byte for the first parcel and the second parcel.

25. The apparatus of claim 24, wherein the one or more processors are configured to:
read the first parcel in a forward order; and
read the second parcel in a backward order.

26. The apparatus of claim 16, wherein the joint termination byte is a final termination byte of the first parcel and the second parcel for processing.

27. The apparatus of claim 16, wherein the encoded video data comprises one or more syntax elements of a video bitstream.

28. The apparatus of claim 27, wherein the one or more syntax elements are indicative of one or more parameters defining a neural network for decoding the encoded video data.

29. The apparatus of claim 28, wherein the one or more parameters defining the neural network comprise at least one of weights of the neural network and an activation function of the neural network.

30. The apparatus of claim 16, wherein the apparatus is one of a mobile device, an extended reality device, or a television, and wherein the apparatus further comprises at least one of a display and a camera configured to capture one or more video frames.

* * * * *